US009953785B2

(12) United States Patent
Fukumoto et al.

(10) Patent No.: US 9,953,785 B2
(45) Date of Patent: *Apr. 24, 2018

(54) RELAY UNIT, CONTROL METHOD FOR RELAY UNIT

(71) Applicant: OMRON Corporation, Kyoto-shi, Kyoto (JP)

(72) Inventors: Tetsuya Fukumoto, Kusatsu (JP); Toshiyuki Higuchi, Kusatsu (JP); Kohei Murakami, Kusatsu (JP); Keishi Yayama, Kusatsu (JP); Satoshi Fujii, Kusatsu (JP)

(73) Assignee: OMRON Corporation, Kyoto-shi (JP)

( * ) Notice: Subject to any disclaimer, the term of this patent is extended or adjusted under 35 U.S.C. 154(b) by 195 days.

This patent is subject to a terminal disclaimer.

(21) Appl. No.: 14/881,858

(22) Filed: Oct. 13, 2015

(65) Prior Publication Data

US 2016/0225561 A1    Aug. 4, 2016

(30) Foreign Application Priority Data

Feb. 2, 2015 (JP) ................................. 2015-018893

(51) Int. Cl.
*H01H 47/22*     (2006.01)
*H01H 47/00*     (2006.01)

(52) U.S. Cl.
CPC .......... *H01H 47/002* (2013.01); *H01H 47/22* (2013.01); *H01H 2047/003* (2013.01); *H01H 2300/052* (2013.01)

(58) Field of Classification Search
USPC ................... 324/423, 424, 421, 422
See application file for complete search history.

(56) References Cited

U.S. PATENT DOCUMENTS

| 5,586,111 | A | * | 12/1996 | Wise | ....................... H04M 3/30 370/241 |
| 6,137,193 | A | | 10/2000 | Kikuoka et al. | |
| 6,621,270 | B2 | * | 9/2003 | Johnson | ............. G01R 31/3278 324/418 |
| 2006/0114635 | A1 | | 6/2006 | Laurent et al. | |
| 2008/0067876 | A1 | | 3/2008 | Nitsche et al. | |

(Continued)

FOREIGN PATENT DOCUMENTS

| CN | 1237268 A | 12/1999 |
| CN | 101073133 A | 11/2007 |
| CN | 101180698 A | 5/2008 |

(Continued)

OTHER PUBLICATIONS

Chinese Official Action dated Jul. 3, 2017 in the counterpart Chinese patent application.

*Primary Examiner* — Vincent Q Nguyen
(74) *Attorney, Agent, or Firm* — Metrolexis Law Group, PLLC

(57) ABSTRACT

The reliability of testing a normally closed contact in a relay unit may involve the following. While the load is de-energized, sending a test signal to a normally closed contact (b1, b2) and detecting the state of the returning test signal sent. Resending a test signal when a detection result does not satisfy a predetermined criteria, and re-detecting the state of the returning test signal resent. The state of the returning test signal resent may be assessed as normal when the re-detection result satisfies the predetermined criteria.

20 Claims, 36 Drawing Sheets

(56) References Cited

U.S. PATENT DOCUMENTS

2009/0251835 A1* 10/2009 Meinherz ............ H01H 47/004
                                                                       361/91.1

FOREIGN PATENT DOCUMENTS

| EP | 0938118 A1 | 8/1999 |
|----|------------|--------|
| EP | 1202313 A1 | 5/2002 |
| JP | H05-055435 U | 7/1993 |
| JP | H09-293440 A | 11/1997 |
| JP | 4870149 B2 | 2/2012 |

* cited by examiner

RELAY UNIT, CONTROL METHOD FOR RELAY UNIT

FIELD

The present invention relates to a relay unit.

BACKGROUND

Relaying units switching between energizing and de-energizing a load (also called "relay units") may be provided with mechanical switching elements containing normally open contacts (a contacts) and normally closed contacts (b contacts). Refer to European Patent Application Publication No. EP1202313A1 (Published 2 May 2002) and Japanese Utility Model Application Publication No. H05-55435 (Published 23 Jul. 1993), for example.

Technical Problem

A normally closed contact in a relay unit of this type may be monitored (tested) using the state of a signal sent while the load is de-energized. However, temporary or recoverable factors occurring in the normally closed contact during monitoring are disadvantageously assessed as an abnormality.

Among other improvements the present invention proposes improving the reliability of testing a normally closed contact in a relay unit.

SUMMARY

A relay unit according to the invention is equipped with a switching circuit including at least one normally open contact and at least one normally closed contact; and a controller for controlling the switching circuit; the switching circuit in a state of de-energizing a load when the normally open contact is open and the normally closed contact is closed, and in a state of energizing a load when the normally open contact is closed and the normally closed contact is open. While the load is de-energized, the controller sends a test signal to the normally closed contact and detects the state of a returning test signal sent; when a detection result does not satisfy a predetermined criteria, the controller resends a test signal and re-detects the state of the returning test signal resent, and assesses the state of the returning test signal resent as normal when the re-detection result satisfies the predetermined criteria.

In this manner, by performing re-detection when the detection result does not satisfy a predetermined criteria, the number of cases may be reduced where the normally close contact is assessed as abnormal due to temporary factors (e.g., vibrations) or recoverable factors (e.g., intrusion of foreign particles) that occur in the normally close contact during the previous detection, thereby increasing the reliability of monitoring a normally closed contact.

DETAILED DESCRIPTION

First Embodiment

Figure 1A:
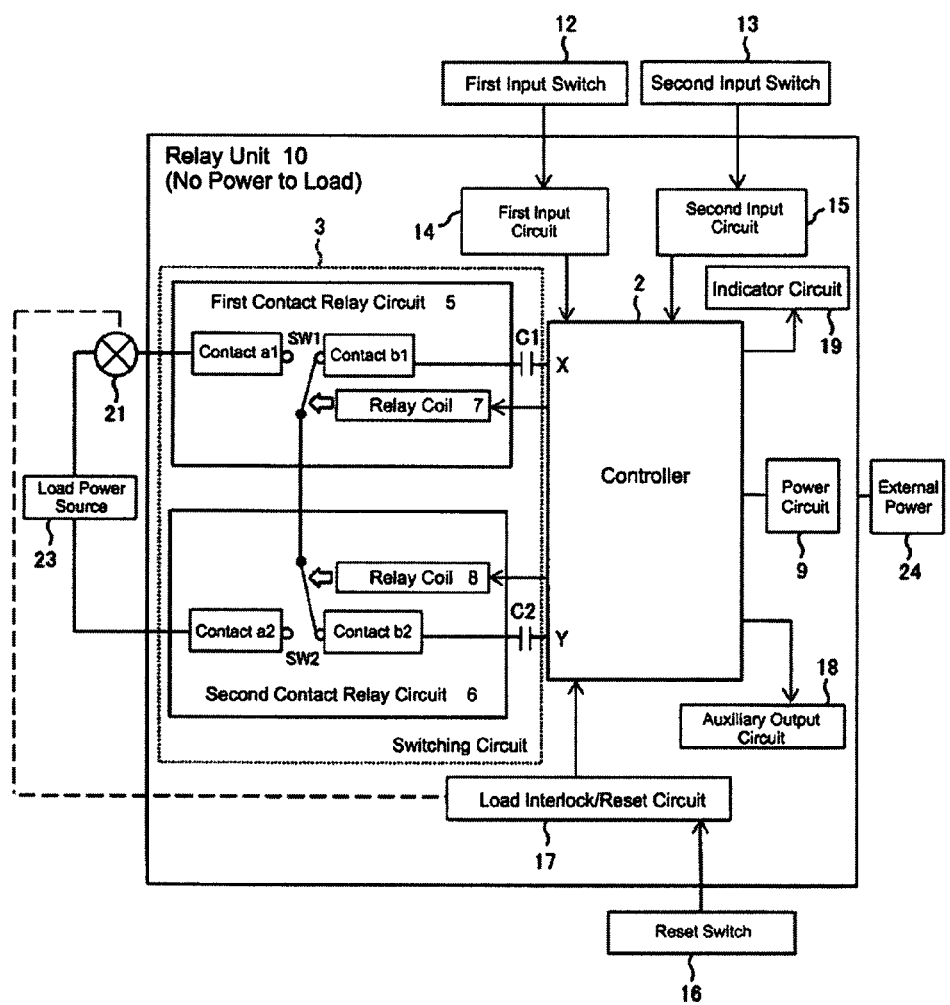
FIGS. 1A to 1C are block diagrams illustrating the configuration of a relay unit according to the first embodiment while no power is sent to the load.

As illustrated in FIGS. 1A to 1C and FIGS. 2A to 2C, a relay unit 10 according to a first embodiment is provided with a controller 2, a switching circuit 3, a power circuit 9, a first and a second input circuit 14, 15, a load interlock and reset circuit 17, an auxiliary output circuit 18, and an indicator circuit 19. The first input circuit 14 receives an input from an external first input switch 12; the second input circuit 15 receives an input from an external second input switch 13; and the load interlock and reset circuit 17 receives an input from an external reset switch 16. An external power source 24 (a direct-current power source) contains a power circuit 9 connected to the controller 2; the external power source 24 supplies electrical power to each of the components in the relay unit 10.

Figure 1B:
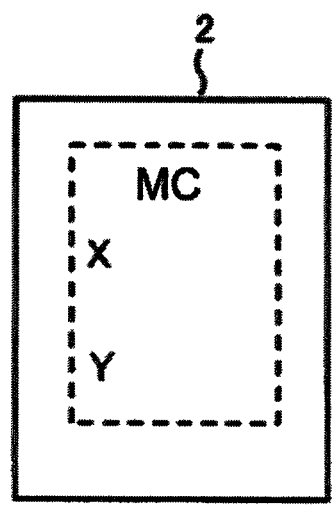
Figure 1C:
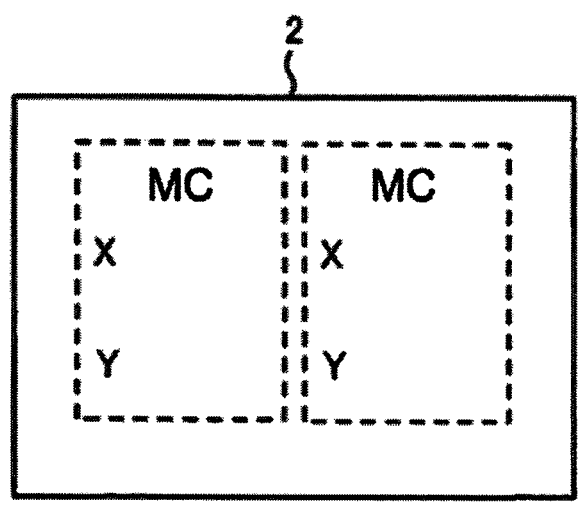

As illustrated in FIG. 1B and FIG. 1C, the controller 2 is made up of one microcomputer (MC, FIG. 1B) or two microcomputers (MC, FIG. 1C) which function as processors that run the programs stored in memory.

The switching circuit 3 is provided with a first contact relay circuit 5, a second contact relay circuit 6, and two insulating capacitors C1, C2.

The first contact relay circuit 5 is a single pole relay equipped with a mechanical switch SW1 containing a contact a1 and a contact b1 (i.e., a normally open contact and a normally closed contact), and a relay coil 7. Exciting the relay coil 7 generates a magnetic field and the magnetic field changes the state of the switch SW1. That is, when the normally open contact a1 is open, the normally closed contact b1 is closed, and when the normally open contact a1 is closed, the normally closed contact b1 is open.

The second contact relay circuit 6 is a single pole relay equipped with a mechanical switch SW2 containing a contact a2 and a contact b2 (i.e., a normally open contact and a normally closed contact), and a relay coil 8. Exciting the relay coil 8 generates a magnetic field and the magnetic field changes the state of the switch SW2. That is, when the normally open contact a2 is open, the normally closed contact b2 is closed, and when the normally open contact a2 is closed, the normally closed contact b2 is open.

The normally closed contacts b1, b2 in the first and second contact relays 5, 6 respectively are connected to the controller 27 via the insulating capacitors C1, C2 respectively. A load 21 and a load power source 23 are also connected in series between the normally open contacts a1, a2.

The controller 2 controls the flow of electricity through each of the relay coils 7, 8 in the switching circuit 3 to switch the relay unit between de-energizing (FIG. 1A) and energizing (FIG. 2A) the load 21. That is, the normally open contact a1 and the normally open contact a2 are open, and the normally closed contact b1 and the normally closed contact b2 are closed so that no power is sent to the load 21; furthermore, the normally open contact a1 and the normally open contact a2 are closed, and the normally closed contact b1 and the normally closed contact b2 open so that power is sent to the load 21.

Figure 2A:
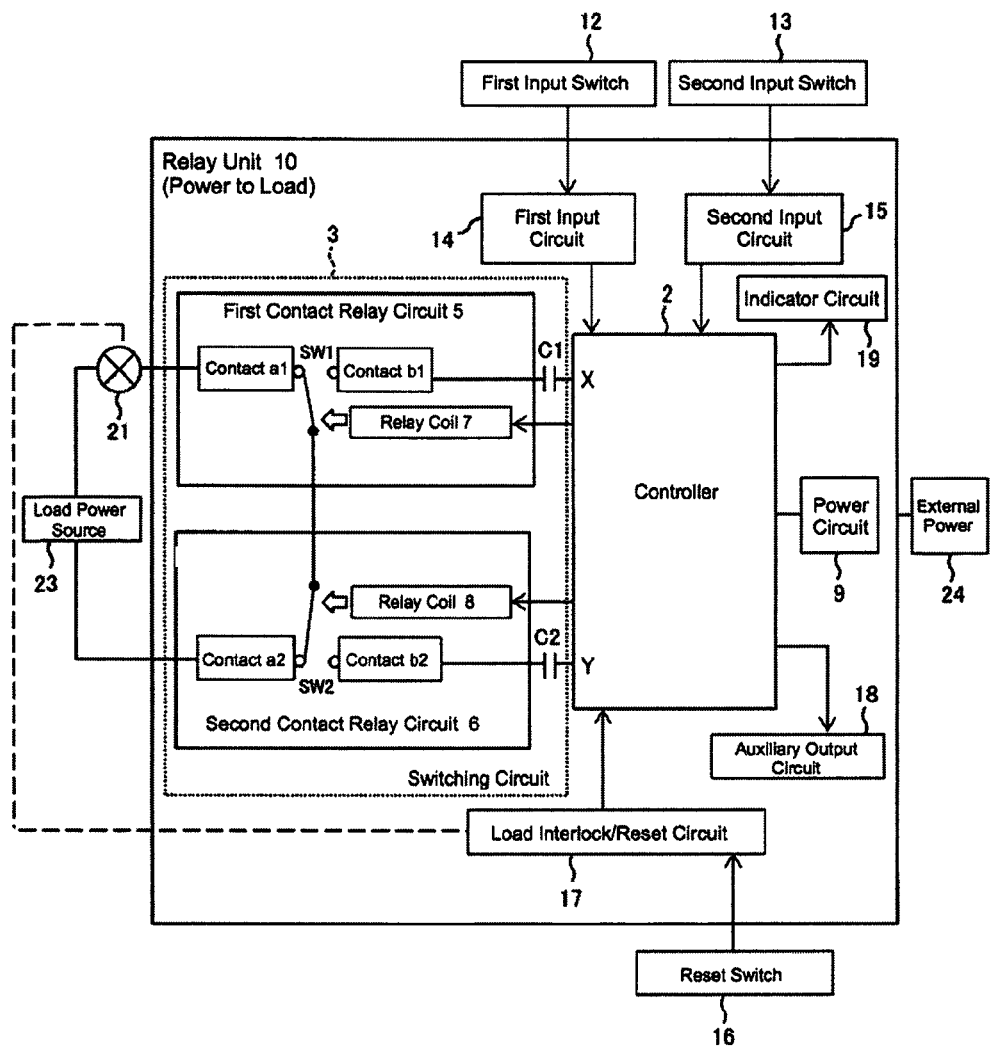
FIGS. 2A to 2C are block diagrams illustrating the configuration of the relay unit according to the first embodiment while power is sent to the load.
Figure 2B:
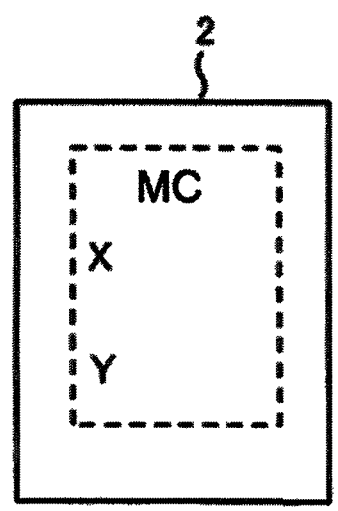
Figure 2C:
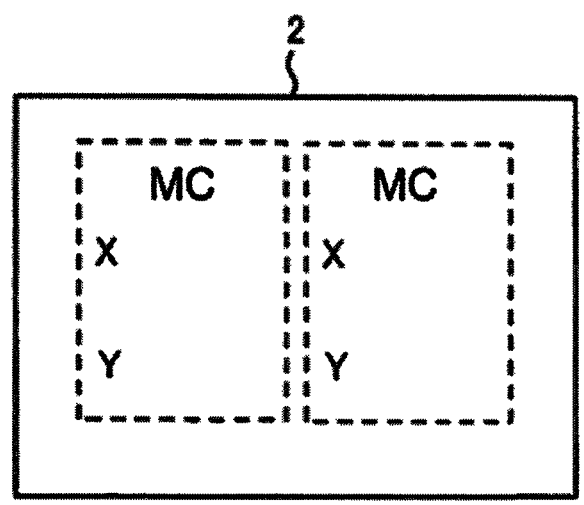

As illustrated in FIG. 1A, when no power is sent to the load 21, the normally closed contact b1 and the normally closed contact b2 are connected, creating a channel that travels from a terminal X in the controller 2 through to the insulating capacitor C1, the normally closed contact b1, the normally closed contact b2, and the insulating capacitor C2. Further, as illustrated in FIG. 2A, when power is sent to the load 21, the normally open contact a1 and normally open contact a2, as well as the load 21, and the load power source 23 (alternating current power source) are connected in series. Note that the first and second contact relays 5, 6 are arranged in series so that the load 21 can be disconnected even when an ON defect (a fault where the normally open contact a1 becomes normally closed) occurs in one of the contact relay circuits (i.e., for redundancy).

A sequence of operations in the relay unit 10 is described below. In the initial state, the external power source 24, both the first input switch 12 and the second input switch 13, the reset switch 16 are off, and no power is being sent to the load 21 (FIG. 1A). However, the load interlock and reset circuit 17 is on (i.e., the load is de-energized).

Here, the controller 2 powers on when the external power source 24 (external power) is turned on. Subsequently, once a safe state is entered, the first input switch 12 and the second input switch 13 are turned on, thereby turning on the first input circuit 14 and the second input circuit 15. At this point, the load interlock and reset circuit 17 is off, is then turned on, and is then turned off again when the reset switch 16 is pressed momentarily. The controller 2 thereby recognizes that both the first input switch 12 and the second input switch 13 are on, and that the load interlock and reset circuit 17 is off. In other words, the controller 2 recognizes that power can be sent to the load 21.

Figure 3A:
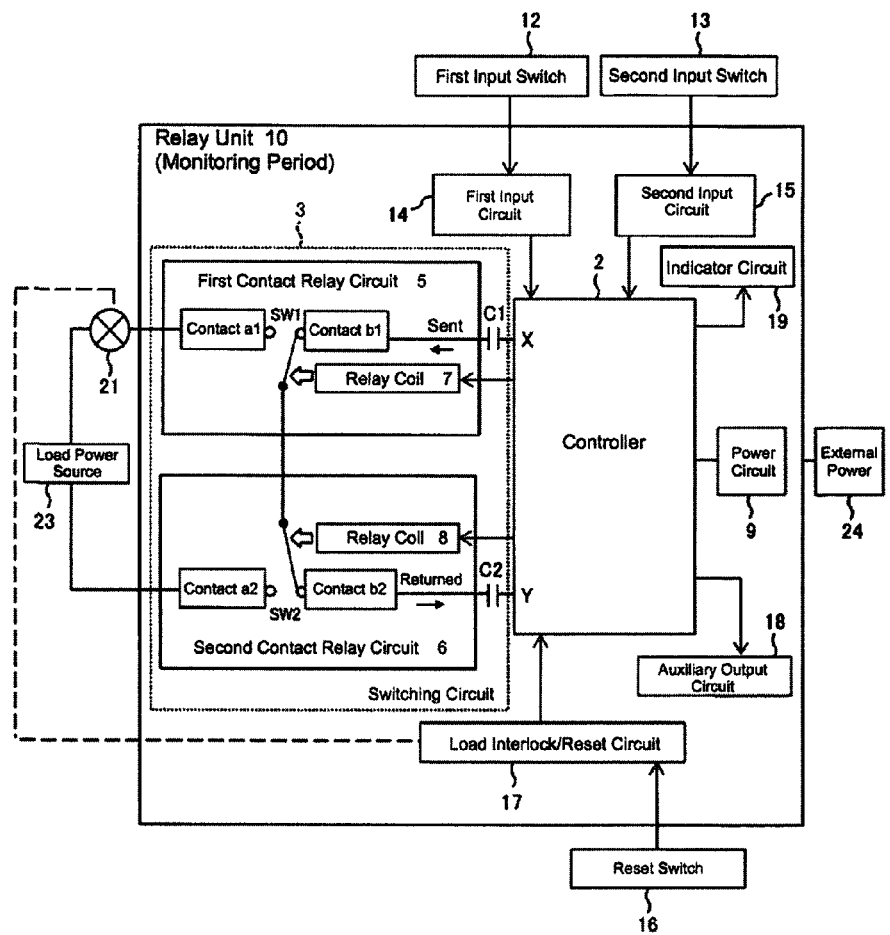
FIGS. 3A to 3C are block diagrams illustrating the configuration of the relay unit according to the first embodiment during a monitoring period.
Figure 3B:
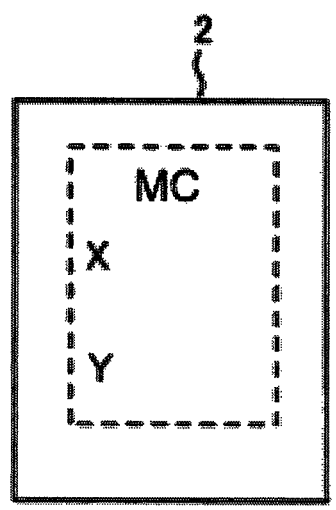
Figure 3C:
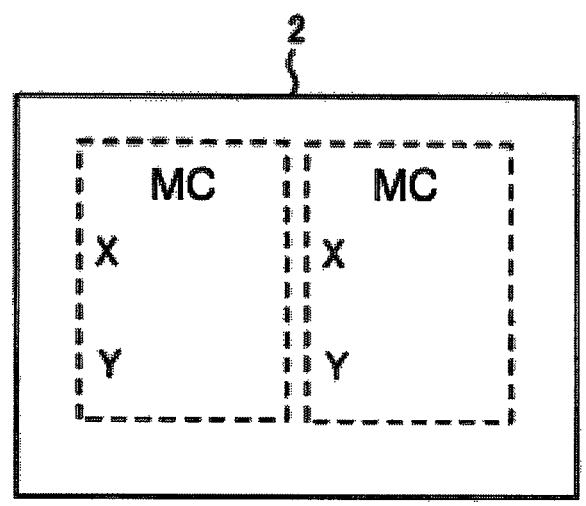

As illustrated in FIG. 3A, the controller 2 detects the state of a test signal sent from the terminal X to the normally closed contact b1 and the normally closed contact b2 and returning on the terminal Y to monitor (test) the normally closed contact b1 and the normally closed contact b2. When the normally closed contact b1 and the normally closed contact b2 are abnormal, the controller 2 controls the flow of electricity to the relay coil 7 and the relay coil 8, closing the normally open contact a1 and the normally open contact a2 and opening the normally closed contact b1 and the normally closed contact b2 (FIG. 2A). Hereby, the load power source 23 is able to energize (supply power) to the load 21.

Further, when at least one of the first input switch 12 and the second input switch 13 is off (i.e., a safe state could not be entered), the controller 2 controls the flow of electricity to the relay coils 7, 8 to open the normally open contacts a1, a2 and to close the normally closed contacts b1, b2 to thereby stop energizing the load 21. Note that the auxiliary output circuit 18 receives input from the controller 2 and notifies an external sequencer, or the like with information on whether the load is energized or de-energized.

Figure 4:
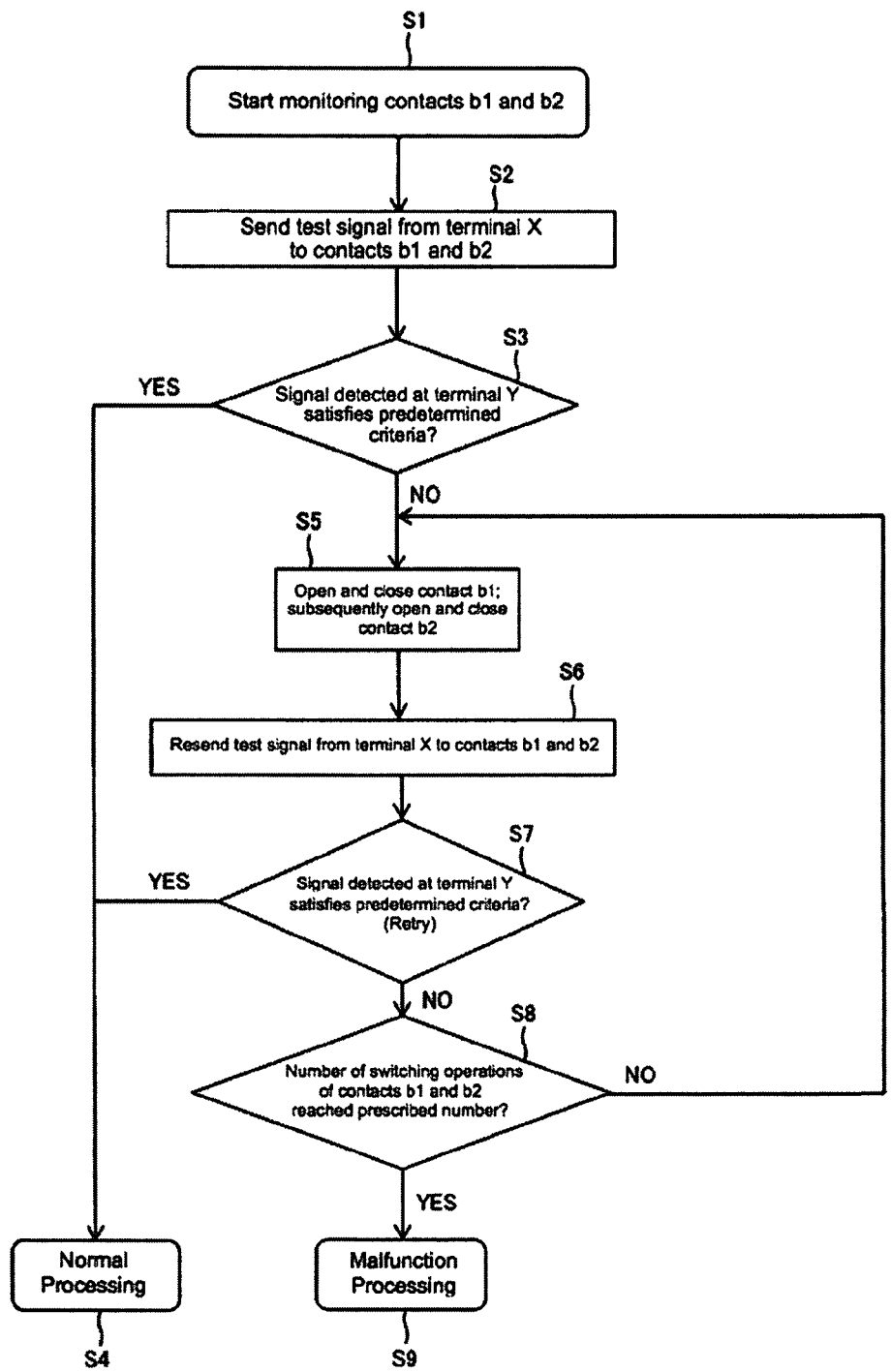
FIG. 4 is a flowchart illustrating a process for monitoring (testing) a b contact in the relay unit according to the first embodiment.

FIG. 4 illustrates the process of monitoring (testing) the normally closed contact b1 and the normally closed contact b2.

On recognizing that the relay is able to send power the load 21, the controller initiates monitoring (testing) of the normally closed contact b1 and the normally closed contact b2 (step S1).

As previously described, closing the normally closed contacts creates a channel from the terminal X to a terminal Y via the insulating capacitor C1, the normally closed contact b1, the normally closed contact b2, and the insulating capacitor C2. The controller 2 sends the test signal which is a pulse signal, from the terminal X to the normally closed contact b1 and the normally closed contact b2 (step S2).

Next the controller 2 determines whether the signal detected at the terminal Y satisfies a predetermined criteria; in other words, the controller 2 assesses whether or not the state of the test signal returned to the controller 2 satisfies a predetermined criteria (YES, or NO at step S3). The aforementioned predetermined criteria may be, for example, that the period of the test signal returned is between a lower limit threshold and an upper limit threshold value inclusive, and that the number of pulses of the test signal returned within a fixed interval is between a lower limit threshold value and an upper limit threshold value, inclusive. Therefore, satisfying these criteria, the test signal is considered to have returned normally. The lower limit and upper limit thresholds for the period, and the lower limit and upper limit thresholds for the number of pulses returned within a fixed interval are determined on the basis of the characteristics of the test signal which is a pulse signal. Processing continues to step S4 for normal processing on the determination of YES at step S3.

On determining NO at step S3, processing continues to step S5 where, the normally closed contact b1 is momentarily opened and then closed; thereafter, the normally closed contact b2 is momentarily opened and then closed. Opening and closing the normally closed contact b2 after opening and closing the normally closed contact b1 is to prevent both the normally closed contact b1 and the normally closed contact b2 from being open simultaneously (i.e., this prevents the normally open contact a1 and the normally open contact a2 from closing simultaneously, sending power to the load 21).

The controller 2 then resends a plurality of test signals from the terminal X to the normally closed contact b1 and the normally closed contact b2, and similarly to step S3, reassesses whether or not the signals detected at the terminal Y satisfy the predetermined criteria (YES or NO; Retry at step S7). Processing continues to normal processing in step S4 on determining YES at step S7.

The determination is NO at step S3 when the normally closed contact b1 or the normally closed contact b2 are tested while foreign particles are lodged between the respective contacts because the increased contact resistance prevents the test signal from passing normally through the normally closed contact b1 or the normally closed contact b2. However, for instance, forcefully opening and closing the contacts b1, b2 as in step S5 may remove the foreign particles lodged therein, or may change the contact point allowing the contact resistance to return to normal, and thus the determination of YES can be made at step S7.

Additionally, when a contact relay circuit is tested while subject to a large amount of vibration or impact, the normally closed contacts b1, b2 each separate momentarily, preventing the test signal from passing through the normally closed contacts b1, b2 normally, causing a determination of NO at step S3. However, a determination of YES is possible at step S7 when the separation problem is resolved by the time the test is retried (step S6 and S7), e.g., if the test is retried before the start of the next vibration period while the problem of momentary separation is resolved; or if the test is retried when the tiny movements in the contacts b1, b2 have subsided after a single incident of accidental impact.

Figure 5A:
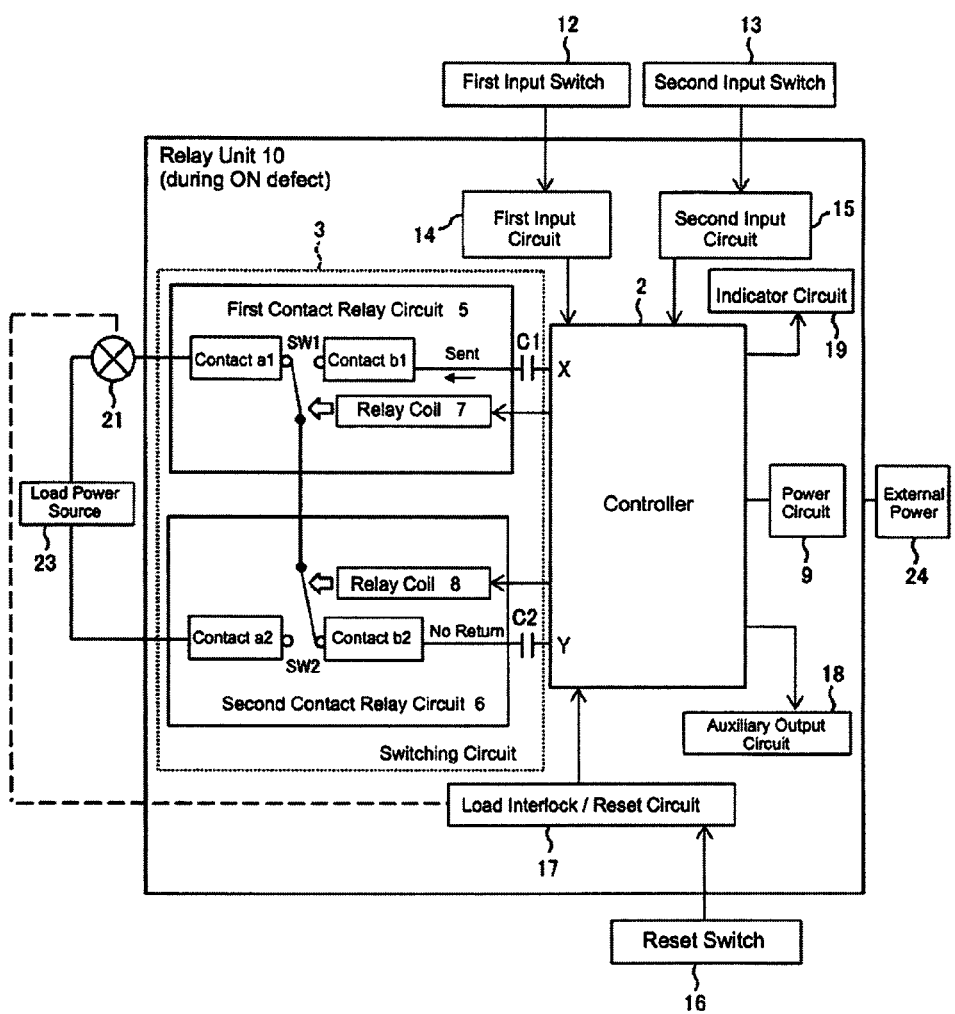
FIGS. 5A to 5C are block diagrams illustrating the state of a relay unit (single pole configuration) during an ON defect.
Figure 5B:
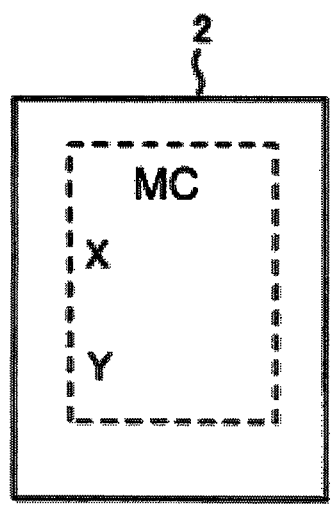
Figure 5C:
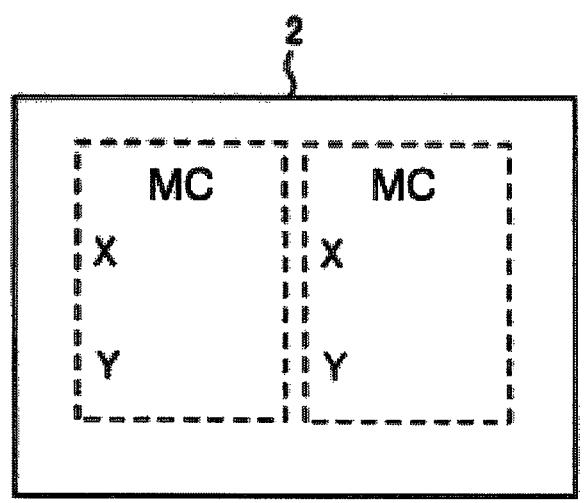

On determining NO in step S7, processing continues to step S8 and assesses whether or not the operation of opening and closing the normally close contact b1 and the normally closed contact b2 was carried out a predetermined number of times (YES or NO, step S8). On determining NO at step S8, processing returns to step S5. On determining YES at step S8, processing continues to step S9 and runs the malfunction processing illustrated in FIGS. 5A-5C, when, for instance, the first contact relay circuit 5 is experiencing an ON defect. That is, the controller 2 closes the normally closed contacts b1 and b2 to maintain de-energization of the load, and controls the indicator circuit 19 and the auxiliary output circuit 18 to provide an external notification of the abnormality.

As illustrated up to this point, if the normally closed contacts b1, b2 in the relay unit have only been tested once, then the reliability of the testing is based on the reliability of the contact relay circuit. In other words, the assessment of abnormal due to temporary factors (e.g., vibration) or recoverable factors (e.g., intrusion of foreign articles) occurring during monitoring in the normally closed contacts b1, b2 rarely occurs when the normally closed contacts b1, b2 with high contact reliability or vibration and impact resistance are used in contact relay circuits, but frequently occur when the normally closed contacts b1m b2 with lower contact reliability or vibration and impact resistance are used in the contact relay circuit.

Because the contacts are retested during monitoring, the number of assessments of an abnormal state due to temporary factors or recoverable factors (e.g., intrusion of foreign articles) occurring during monitoring decreases even when the relay unit 10 according to the embodiment uses first and second contact relay circuits 5, 6 where the normally closed contacts b1, b2 do not have high contact reliability or high vibration and impact resistance (i.e., the first and second contact relay circuits are generic relays). Hereby, the monitoring reliability improves, and the reliability of the relay unit 10 also improves.

Figure 6:
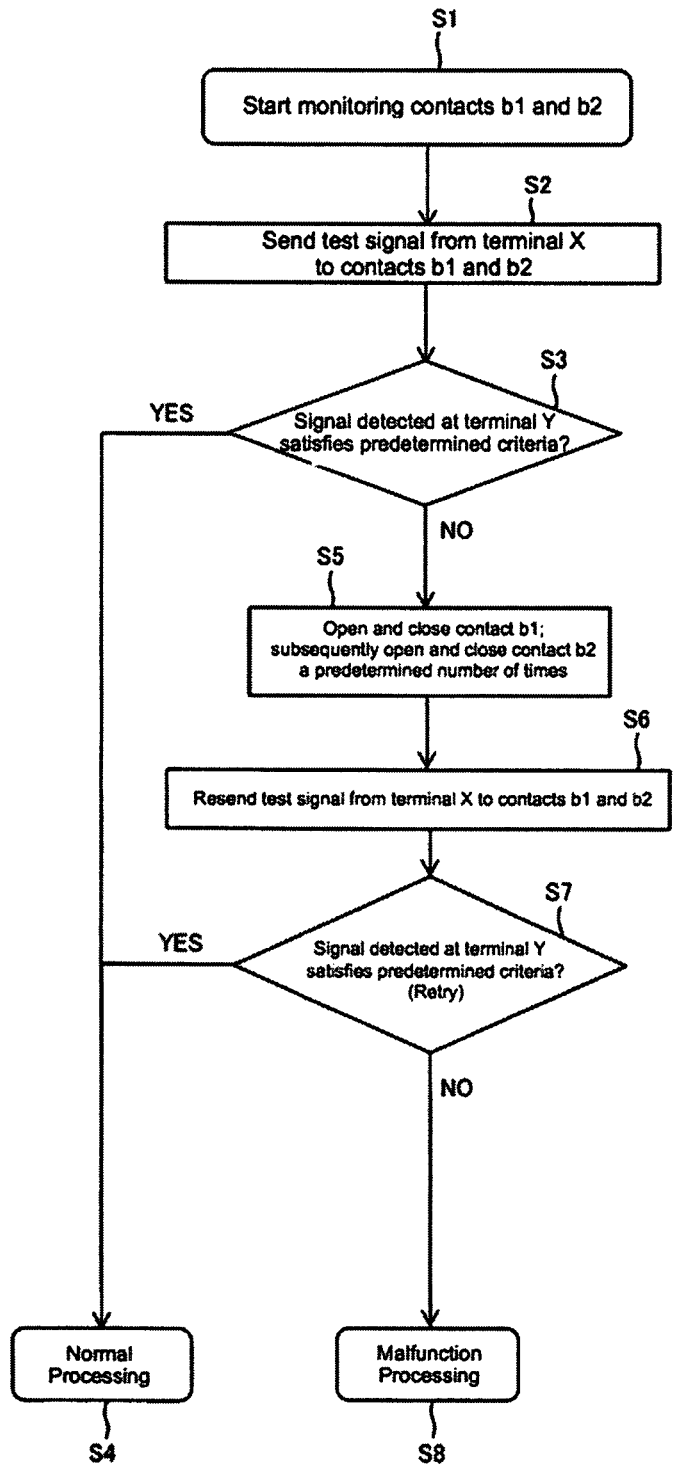
FIG. 6 is a flowchart illustrating another example of a process for monitoring a b contact according to the first embodiment.

FIG. 6 is a flowchart illustrating another example of a process for monitoring (testing) the normally closed contacts b1, b2. Similarly to FIG. 4, the monitoring of the normally closed contact b1, b2 is initiated in step S1, and a test signal (pulse signal) is sent from the terminal X to the normally closed contacts b1, b2.

Next the controller determines whether the signal detected at the terminal Y satisfies a predetermined criteria (YES, or NO at step S3). Processing continues to step S4 for normal processing on the determination of YES at step S3. On determining NO at step S3, processing continues to step S5, wherein an operation switching the normally closed contact b1 and then switching the normally closed contact b2 is performed a predetermined number of times.

The controller 2 then resends a test signal from the terminal X to the normally closed contacts b1, b2, and similarly to step S3, reassesses whether or not the signals detected at the terminal Y satisfy the predetermined criteria (YES or NO; Retry at step S7). Processing continues to normal processing in step S4 on determining YES at step S7, or proceeds to malfunction processing in step S8 on determining NO at step S7.

Figure 7:
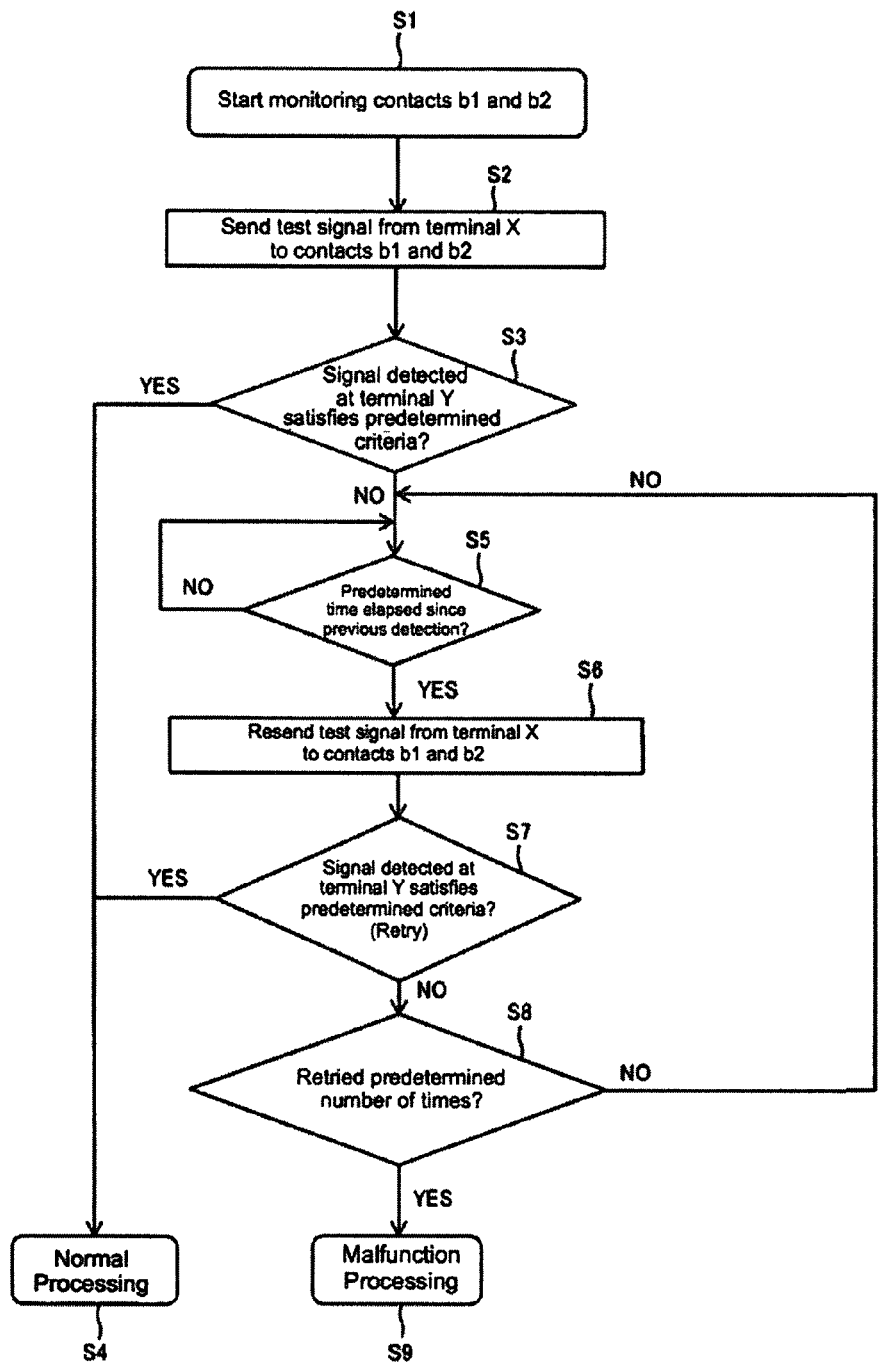
FIG. 7 is a flowchart illustrating another example of a process for monitoring a b contact according to the first embodiment.

FIG. 7 is a flowchart illustrating another example of a process for monitoring (testing) the normally closed contacts b1, b2. Similarly to FIG. 4, the monitoring of the normally closed contact b1, b2 is initiated in step S1, and a test signal (pulse signal) is sent from the terminal X to the normally closed contacts b1, b2.

Next the controller determines whether the signal detected at the terminal Y satisfies a predetermined criteria (YES, or NO at step S3). Processing continues to step S4 for normal processing on the determination of YES at step S3. On determining NO at step S3, processing continues to step S5, to determine whether or not a predetermined time has elapsed since the previous detection. If YES, processing continues to step S6.

In step S6 the controller 2 resends a test signal from the terminal X to the normally closed contacts b1, b2, and similarly to step S3, reassesses whether or not the signals detected at the terminal Y satisfy the predetermined criteria (YES or NO; Retry at step S7). On determining YES at step S7, processing continues to step S4 to run normal processing, or on determining NO at step S7 continues to step S8 to determine whether or not there has been a predetermined number of retries (YES or NO at step S8). Processing returns to step S5 on determining NO at step S8, or proceeds to malfunction processing in step S9 on determining YES at step 8.

While in the previous description the period or the number of pulses of the returning test signal within a fixed interval serve as the predetermined criteria, the predetermined criteria as not limited to such. For instance, the duty cycle representing the proportion of time the signal is on (high) during one period may also be used, where the predetermined criteria is whether the duty cycle of the returning test signal is between a lower limit threshold and an upper limit threshold, inclusive.

Figure 14A:
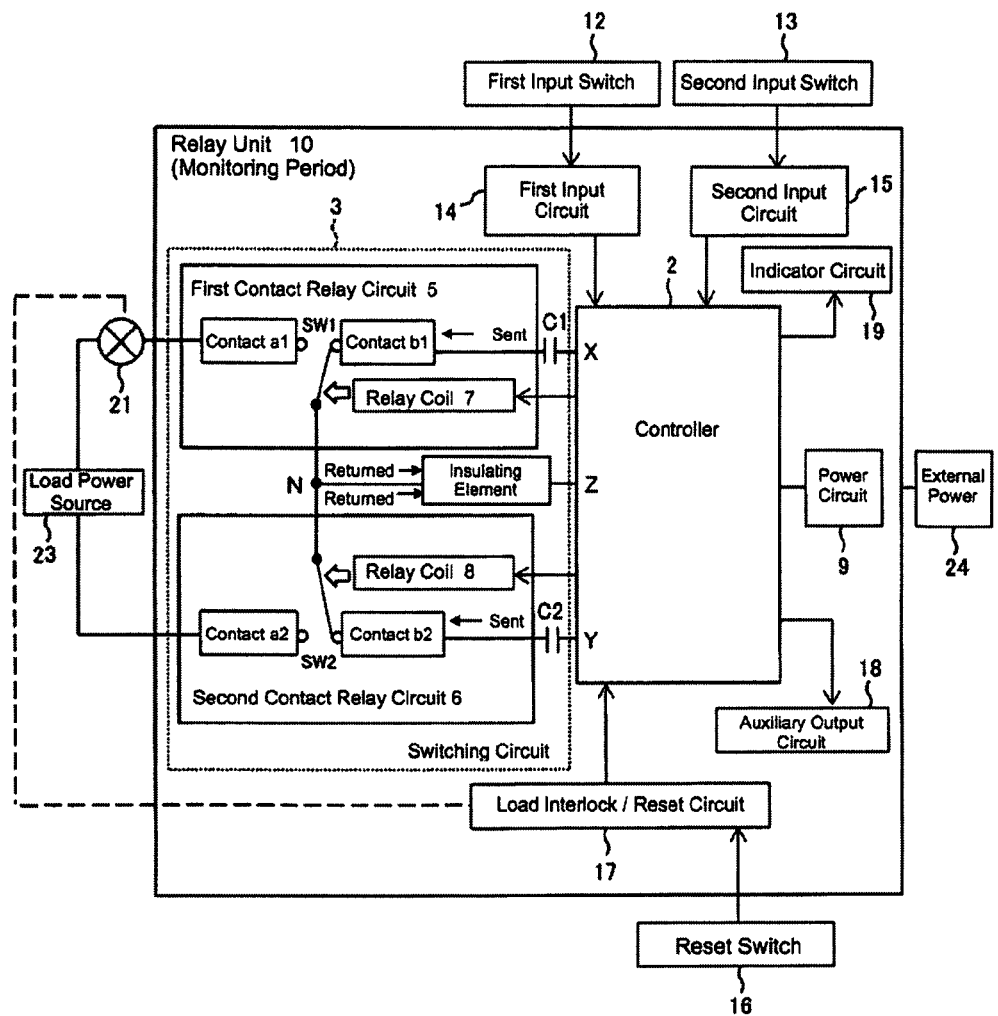
FIGS. 14A to 14C are block diagrams illustrating another configuration of the relay unit according to the first embodiment during a monitoring period.
Figure 14B:
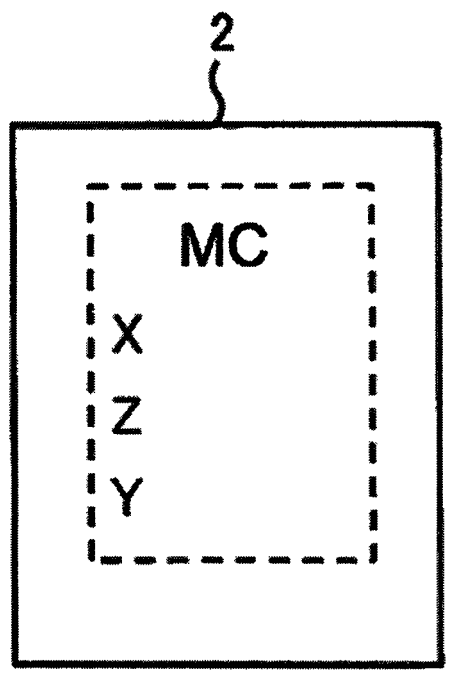
Figure 14C:
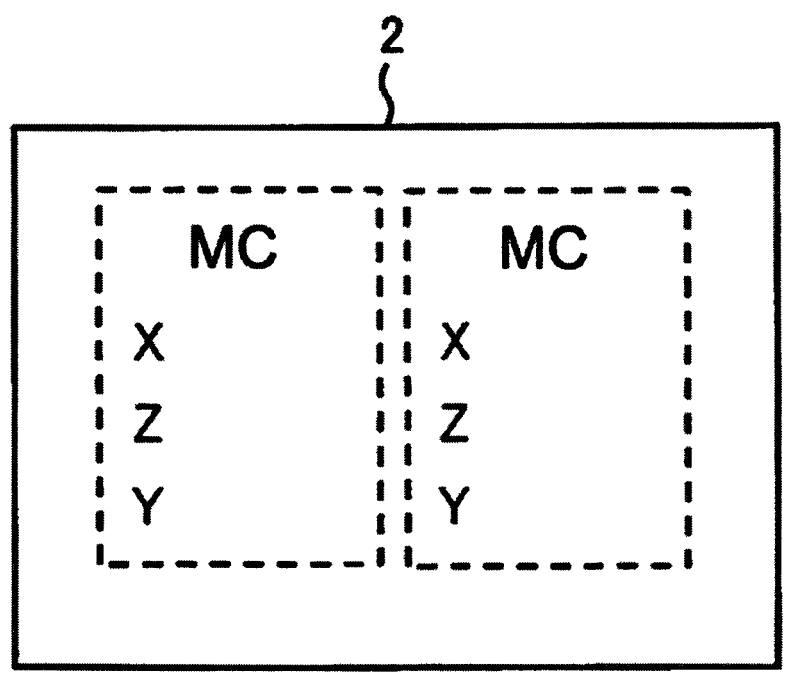

FIGS. 14A-14C illustrate a modification example of the first embodiment. More specifically, a node N, and a terminal Z in the controller 2 are connected via an insulating element, wherein the normally closed contact Pb1, the node N, and the normally closed contact b2 are connected in series when the load is de-energized (during testing). The normally closed contact b1 and the normally closed contact b2 may be monitored individually (sequentially), because when the load is de-energized (during monitoring) this configuration creates a circuit from the terminal X, the insulating capacitor C1, the normally closed contact b1, the node N, and the insulating element up to the terminal Z, and a circuit from the terminal Y, the insulating capacitor C2, the normally closed contact b2, the node N, and the insulating element up to the terminal Z.

Second Embodiment

As illustrated in FIGS. 8A to 8C and 9A to 9C, the relay unit 10 according to a second embodiment is provided with a controller 2, a switching circuit 3, a power circuit 9, a first and a second input circuit 14, 15, a load interlock and reset circuit 17, an auxiliary output circuit 18, and an indicator circuit 19. The first input circuit 14 receives an input from an external first input switch 12; the second input circuit 15 receives an input from an external second input switch 13; and the load interlock and reset circuit 17 receives an input from an external reset switch 16. An external power source 24 (a direct-current power source) contains a power circuit 9 connected to the controller 2; the external power source 24 supplies electrical power to each of the components in the relay unit 10.

Figure 8A:
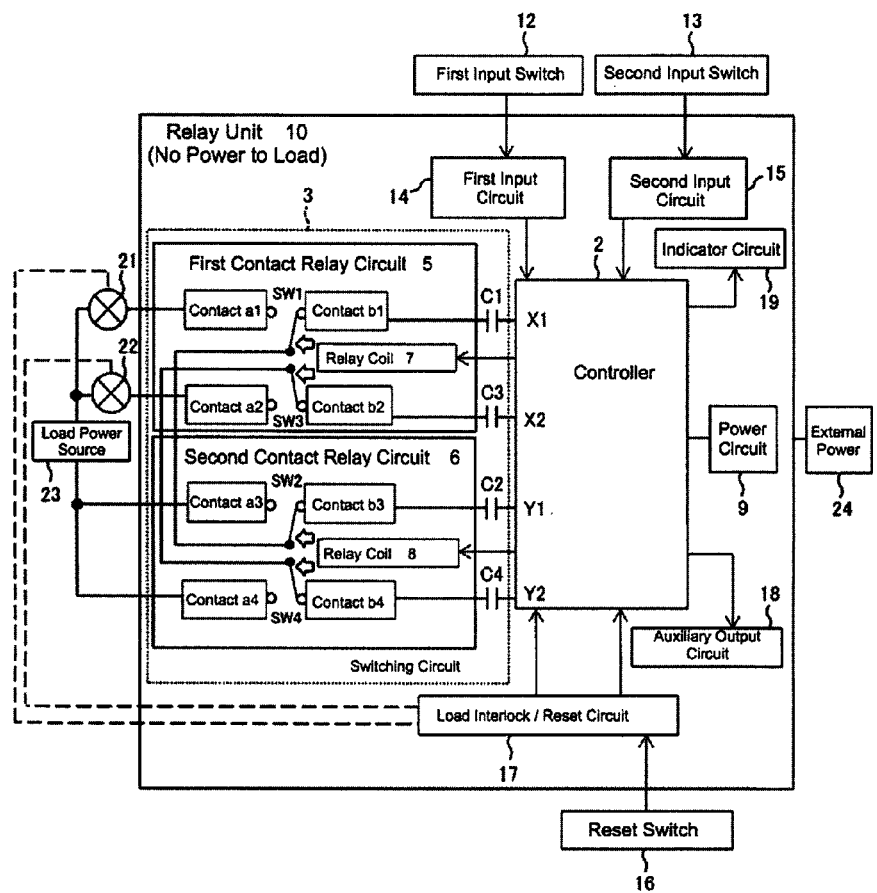
FIGS. 8A to 8C are block diagrams illustrating the configuration of a relay unit according to the second embodiment while no power is sent to the load.
Figure 8B:
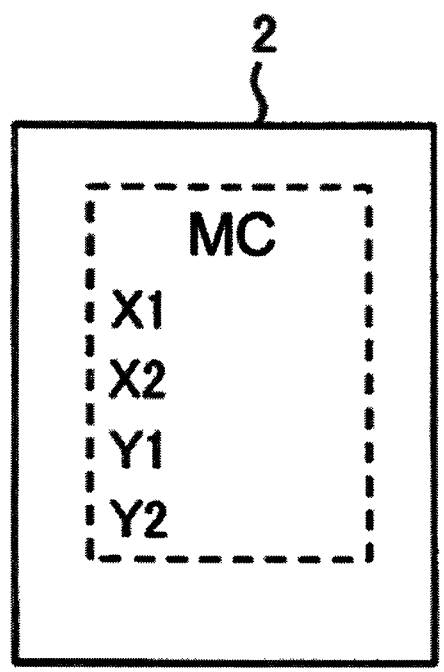
Figure 8C:
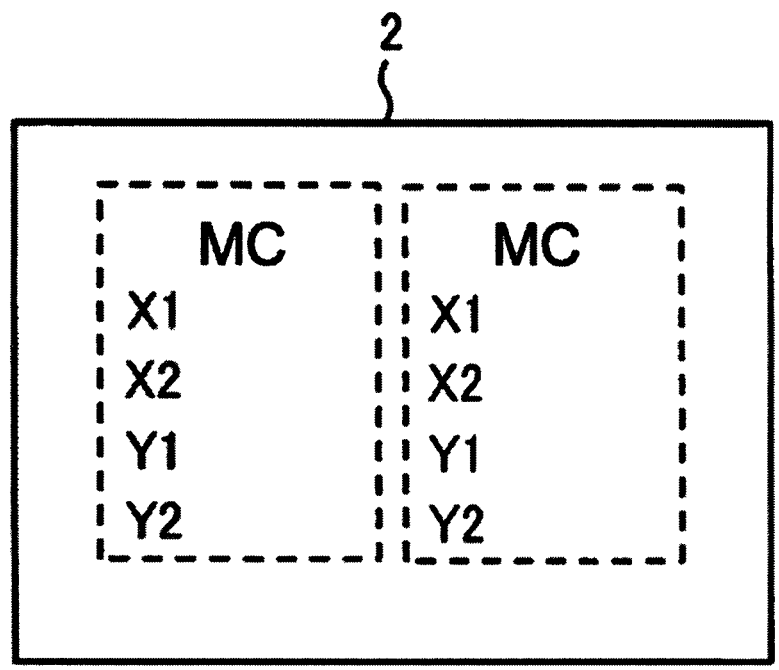

As illustrated in FIG. 8B and FIG. 8C, the controller 2 is made up of a one (FIG. 8B) or two (FIG. 8C) microcomputers (MC) which function as processors that run the programs stored in memory.

The switching circuit 3 is provided with a first contact relay circuit 5, a second contact relay circuit 6, and four insulating capacitors C1-C4.

The first contact relay circuit 5 is a double pole relay equipped with a mechanical switch SW1 containing a contact a1 and a contact b1, a mechanical switch SW3 containing a contact a3 and a contact b3, and a relay coil 7. Exciting the relay coil 7 generates a magnetic field and the magnetic field changes the state of the switches SW1, SW3. That is, when the normally open contact a1 is open, the normally closed contact b1 is closed, and when the normally open contact a1 is closed, the normally closed contact b1 is open. Further, when the normally open contact a3 is open, the normally closed contact b3 is closed, and when the normally open contact a3 is closed, the normally closed contact b3 is open.

The second contact relay circuit 6 is a double pole relay equipped with a mechanical switch SW2 containing a contact a2 and a contact b2, a mechanical switch SW4 containing a contact a4 and a contact b4, and a relay coil 8. Exciting the relay coil 8 generates a magnetic field and the magnetic field changes the state of the switches SW2, SW4. That is, when the normally open contact a2 is open, the normally closed contact b2 is closed, and when the normally open contact a2 is closed, the normally closed contact b2 is open. Further, when the normally open contact a4 is open, the normally closed contact b4 is closed, and when the normally open contact a4 is closed, the normally closed contact b4 is open.

Note that the normally closed contacts b1, b2, b3, b4 are connected to the controller 2 via the insulating capacitors C1, C2, C3, C4 respectively.

The load 21 and the load power source 23 (alternating current power source) are also connected in series between the normally open contacts a1, a2. Additionally, a load 22 and the load power source 23 are connected in series between the normally open contacts a3, a4.

The controller 2 controls the flow of electricity through each of the relay coils 7, 8 in the switching circuit 3 to switch the relay unit between de-energizing (FIG. 8A) and energizing (FIG. 9A) the loads 21, 22. That is, the normally open contact a1, the normally open contact a2, normally open contact a3, and the normally open contact a4 (abbreviated, normally open contact a1-a4, below) are open, and the normally closed contact b1, normally closed contact b2, normally closed contact b3, and the normally closed contact b4 (abbreviated, normally closed contact b1-b4, below) are closed so that no power is sent to the loads 21, 22; furthermore, the normally open contacts a1-a4 are closed, and the normally closed contacts b1-b4 are opened so that power is sent to the loads 21, 22.

As illustrated in FIGS. 8A-8C, when the loads 21, 22 are de-energized, the normally closed contacts b1, b2 are connected, creating a first channel (channel 1) from a terminal X1 to a terminal Y1 in the controller 2 passing through the insulating capacitor C1, the normally closed contact b1, the normally closed contact b2, and the insulating capacitor C2. Moreover, when the loads 21, 22 are de-energized, the normally closed contacts b3, b4 are connected, creating a second channel (channel 2) from a terminal X2 to a terminal Y2 in the controller 2 through the insulating capacitor C3, the normally closed contact b3, the normally closed contact b4, and the insulating capacitor C4.

Figure 9A:
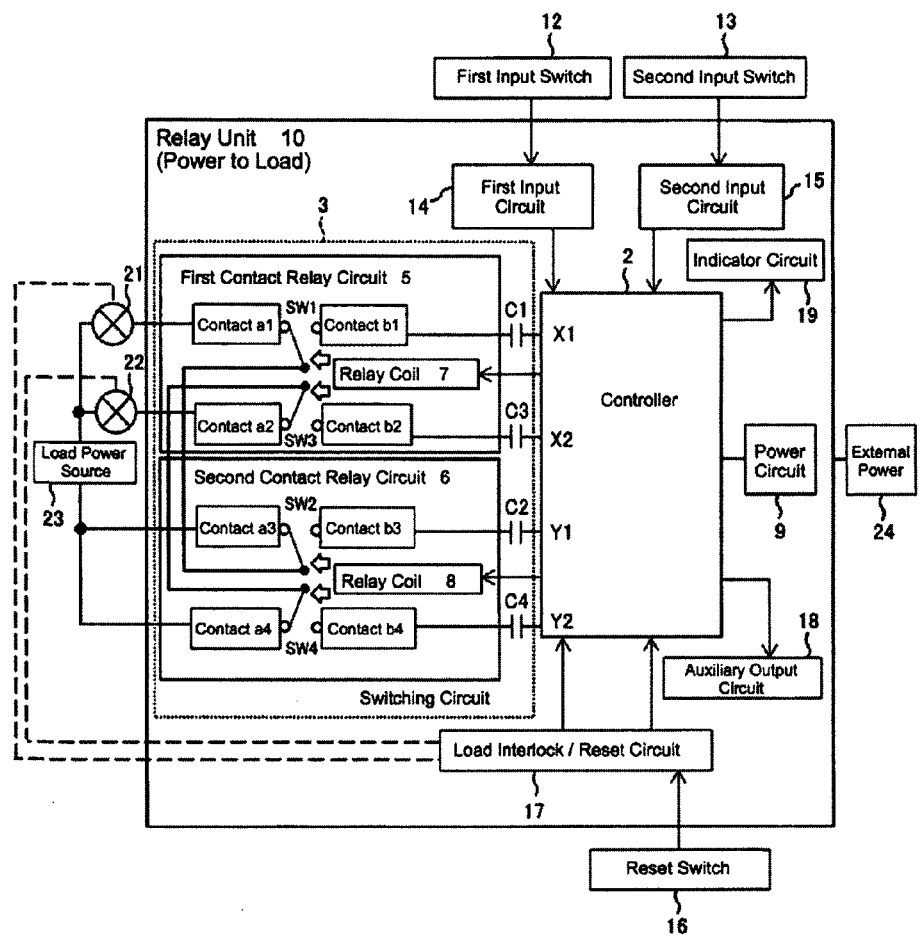
FIGS. 9A to 9C are block diagrams illustrating the configuration of the relay unit according to the second embodiment while power is sent to the load.
Figure 9B:
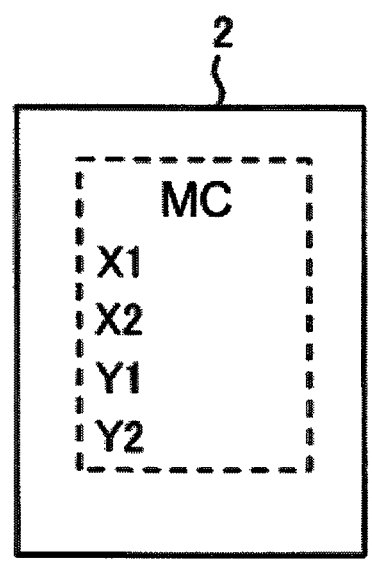
Figure 9C:
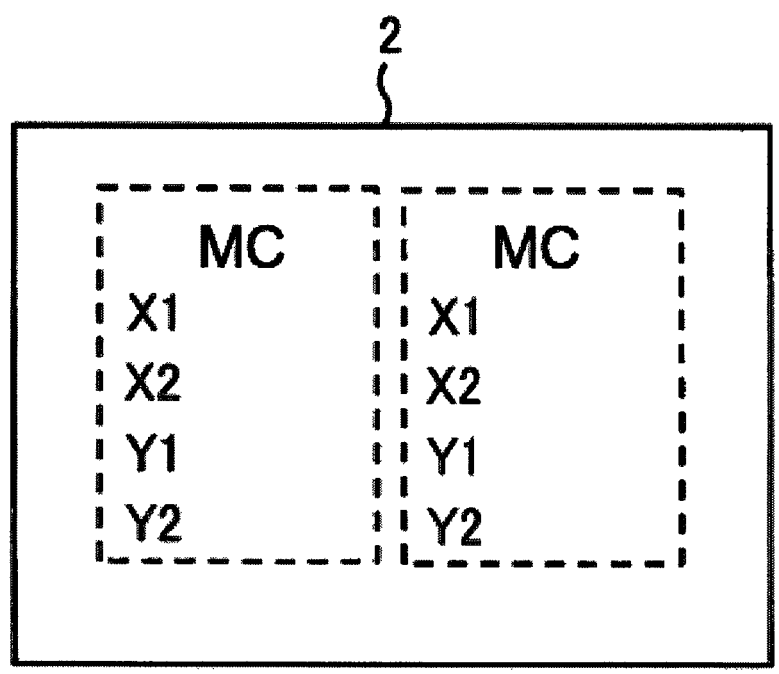

As illustrated in FIG. 9A, when the loads 21, 22 are energized, the normally open contacts a1, a2, the load 21, and the load power source 23 are connected in series, and the normally open contacts a3, a4, the load 22, and the load power source 23 are connected in series. Note that the first and second contact relays 5, 6 are arranged in series so that the loads 21, 22 can be disconnected even when an ON defect (a fault where the normally open contact a becomes normally closed) occurs in one of the contact relay circuits (i.e., for redundancy).

A sequence of operations in the relay unit 10 is described below. In the initial state, the external power source 24, both the first input switch 12 and the second input switch 13, the reset switch 16 are off, and the load 21 is de-energized (FIG. 8A). However, the load interlock and reset circuit 17 is on (i.e., both loads are de-energized).

Here, the controller 2 powers on when the external power source 24 (external power) is turned on. Subsequently, once a safe state is entered, the first input switch 12 and the second input switch 13 are turned on, thereby turning on the first input circuit 14 and the second input circuit 15. At this point, the load interlock and reset circuit 17 is off, is then turned on, and is then turned off again when the reset switch 16 is pressed momentarily. The controller 2 thereby recognizes that both the first input switch 12 and the second input switch 13 are on, and that the load interlock and reset circuit 17 is off. In other words, the controller 2 recognizes that power can be sent to the loads 21, 22.

Figure 10A:
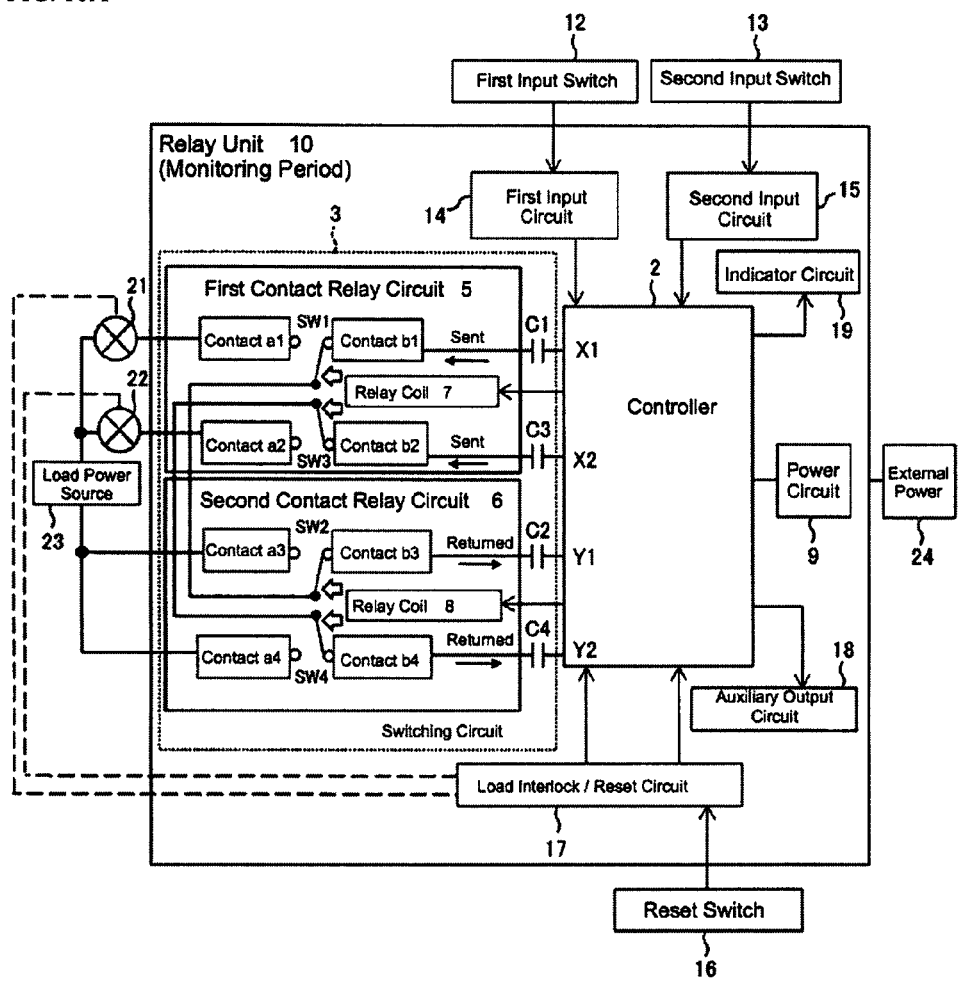
FIGS. 10A to 10D are block diagrams illustrating the configuration of the relay unit according to the second embodiment during a monitoring period.
Figure 10B:
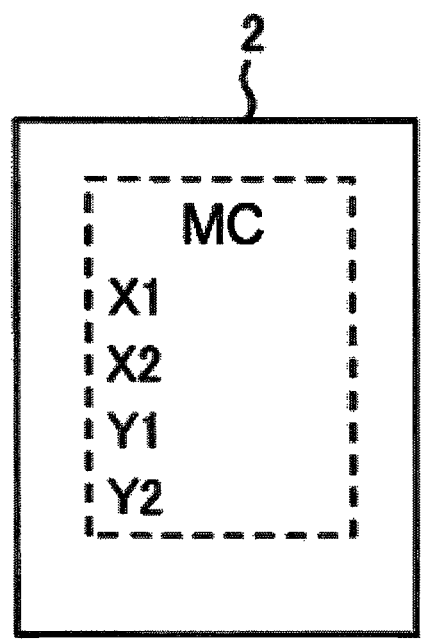

At that point, as illustrated in FIG. 10A, the controller 2 detects the state of the test signals sent from terminal X1 and terminal X2 to the normally closed contact b1, b2 and the normally closed contacts b3, b4 and returning on the terminal Y1 and the terminal Y2 respectively, to thereby monitor (test) the normally closed contacts b1, b2 and the normally closed contacts b3, b4 respectively. When there are no abnormalities in the normally closed contacts b1-b4, the controller controls the flow of current to the relay coils 7, 8 to close the normally open contacts a1-a4, and to open the normally closed contacts b1-b4 (FIG. 9A). Hereby, the load power source 23 can energize (supply power to) the loads 21, 22.

Further, when at least one of the first input switch 12 and the second input switch 13 is off (i.e., a safe state could not be entered), the controller 2 controls the flow of electricity to the relay coils 7, 8 to open the normally open contacts a1-a4, and to close the normally closed contacts b1-b4 to thereby stop energizing the loads 21, 22 (FIG. 8A). Note that the auxiliary output circuit 18 receives input from the controller 2 and notifies an external sequencer, or the like with information on whether the loads 21, 22 are energized or de-energized.

Figure 11:
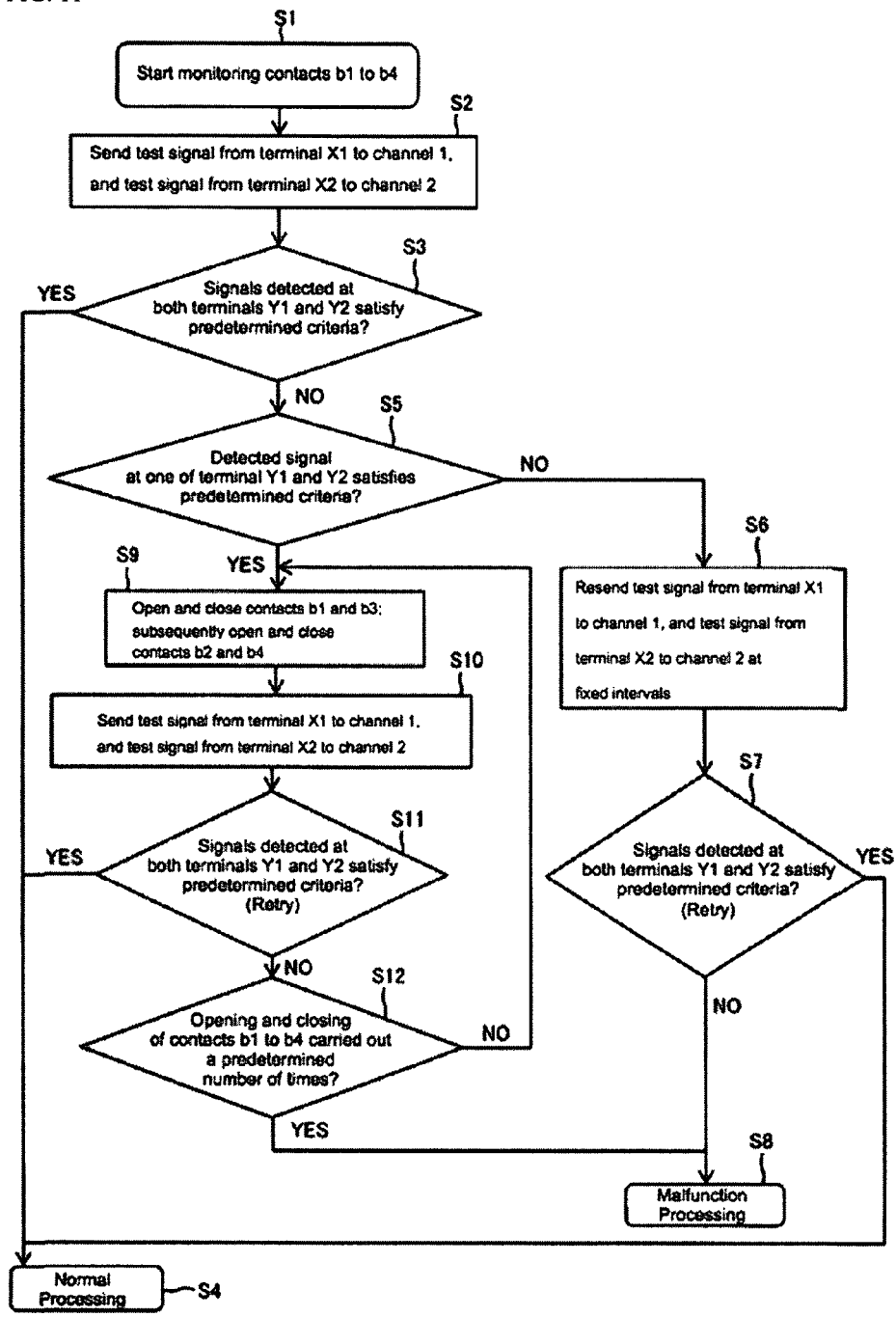
FIG. 11 is a flowchart illustrating a process for monitoring (testing) a b contact in the relay unit according to the second embodiment.

FIG. 11 is a flowchart illustrating a process for monitoring (testing) the normally closed contacts b1-b4.

The controller 2 initiates monitoring (testing) of the normally closed contacts b1-b4 (step S1) on recognizing that the relay is able to energize the loads 21, 22.

As previously described, closing the normally closed contacts creates the first channel (channel 1) from the terminal X1 to the terminal Y1 via the insulating capacitor C1, the normally closed contact b1, the normally closed contact b2, and the insulating capacitor C2, and creates the second channel (channel 2) from the terminal X2 to the terminal Y2 via the insulating capacitor C3 the normally closed contact b3, the normally closed contact b4, and the insulating capacitor C4. The controller 2 sends a first test signal which is a pulse signal to channel 1, which includes the normally closed contacts b1, b2, and a second test signal which is a pulse signal to channel 2, which includes the normally closed contacts b3, b4 (step S2).

Next, the controller 2 determines whether the signals detected at each of the terminals Y1, Y2 satisfy a predetermined criteria; in other words, the controller 2 assesses whether or not the state of the test signal returned to the controller 2 (on terminal Y1) satisfies a first predetermined criteria, and whether or not the state of the test signal returned to the controller 2 (on terminal Y2) satisfies a second predetermined criteria (YES or NO at step S3).

The first predetermined criteria may be, for example, whether the period of the test signal returned is between a first lower limit threshold and a first upper limit threshold value inclusive, and whether the number of pulses of the test signal returned within a fixed interval is between a first lower limit threshold value and a first upper limit threshold value, inclusive. Therefore, satisfying these criteria, the test signal is considered to have returned normally. The second predetermined criteria may be, for example, whether the period of the test signal returned is between a second lower limit threshold and a second upper limit threshold inclusive, and whether the number of pulses of the test signal returned within a fixed interval is between a second lower limit threshold value and a second upper limit threshold value, inclusive. Therefore, satisfying these criteria, the test signal is considered to have returned normally. The first lower and upper limit thresholds for a period, and the first lower and upper limit thresholds for the number of pulses of the test signal returned within a fixed interval may be established on the basis of the characteristics of the first test signal; while the second lower and upper limit thresholds for a period, and the second lower and upper limit thresholds for the number of pulses of the test signal returned within a fixed interval may be established on the basis of the characteristics of the second test signal. Processing continues to step S4 for normal processing on the determination of YES at step S3.

On determining NO at step S3, processing continues to step S5 and the controller 2 determines whether either of the signal detected at the terminal Y1 satisfies the first predetermined criteria or the signal detected at the terminal Y2 satisfies the second predetermined criteria (YES, step S5), or neither of the signals detected at the terminal Y1 satisfies the first predetermined criteria or the signal detected at the terminal Y2 satisfies the second predetermined criteria (NO, step S5).

At NO in step 5 at least one of the contact relay circuits is experiencing an ON defect, or at least one of the normally closed contacts in the channels is open due to vibration or impact. Thus, a test signal is resent from terminal X1 to channel 1, and a test signal is resent from terminal X2 to channel 2 at fixed intervals (step S6).

Next, the controller 2 determines whether or not the signal detected at the terminal Y1 satisfies the first predetermined criteria and the signal detected at the terminal Y2 satisfies the second predetermined criteria (Retry; YES or NO, at step S7). At this point, YES at step S7 points to vibration or impact as the cause of the problem, and processing continues to step S4 for normal processing. However, NO at step S7 points to at least one of the contact relay circuits experiencing an ON defect. In this case, when the normally closed contacts b1, b3 are open (the normally open contacts a1, a3 are closed), and the normally closed contacts b2, b4 are open (the normally open contacts a2, a4 are closed), processing immediately transitions to malfunction processing (step S8) given the risk that both the first and second relay circuits 5, 6 may be on and energizing the loads 21, 22 (i.e., in an undesirable state). That is, the controller 2 closes the normally closed contacts b1-b4 to maintain de-energization of the loads 21, 22, and controls the indicator circuit 19 and the auxiliary output circuit 18 to provide an external notification of the abnormality.

Whereas, at YES in step S5, at least one of the normally closed contacts in one of the channels is experiencing the ON defect, or is having a contact failure. Therefore, processing continues to step S9 where the normally closed contacts b1, b3 are momentarily opened and then closed; thereafter, the normally closed contacts b2, b4 are momentarily opened and then closed. The normally closed contacts b2, b4 are opened and closed after opening and closing the normally closed contacts b1, b3 to prevent both the normally closed contacts b1, b2 from being open simultaneously (i.e., to ensure that the normally open contacts a1, a2 are not open simultaneously, energizing the load 21); and to prevent both the normally closed contacts b3, b4 from being open simultaneously (i.e., to ensure that the normally open contacts a3, a4 are not open simultaneously, energizing the load 22);

The first test signal is then resent from terminal X1 to channel 1, and the second test signal is resent from terminal X2 to channel 2 (step S10).

Next the controller 2 determines whether the signal detected at the terminal Y1 satisfies the first predetermined criteria and the signal detected at the terminal Y2 satisfies the second predetermined criteria (Retry; YES or NO at step S11).

Figure 12A:
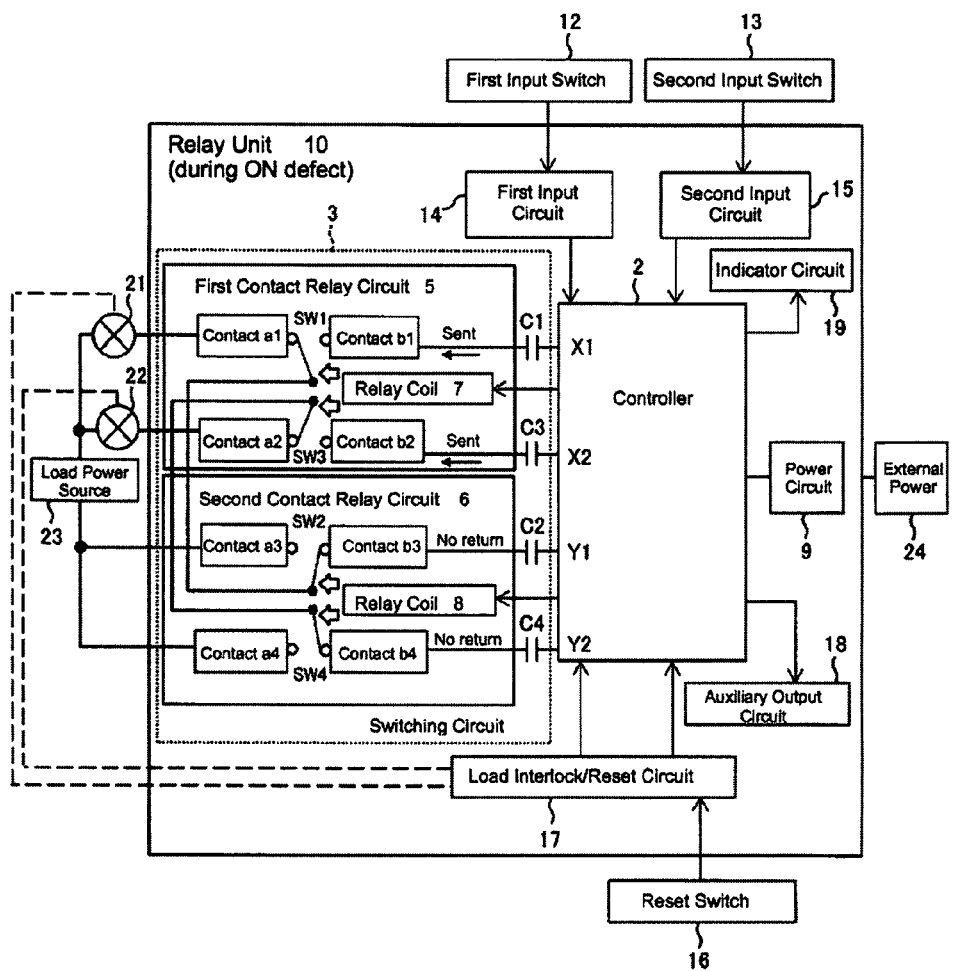
FIGS. 12A to 12C are block diagrams illustrating the state of a relay unit (double pole configuration) during an ON defect.
Figure 12B:
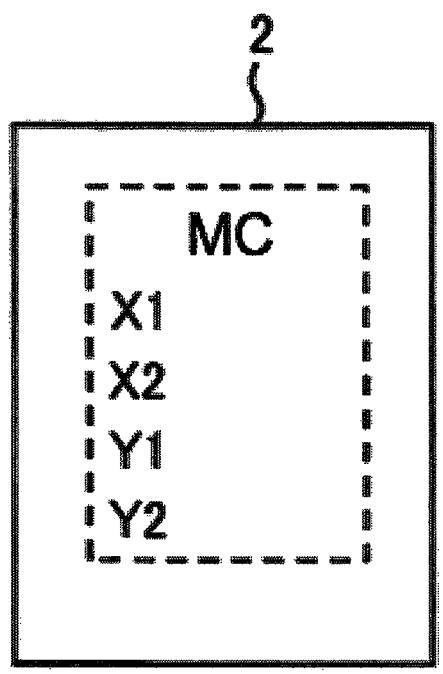
Figure 12C:
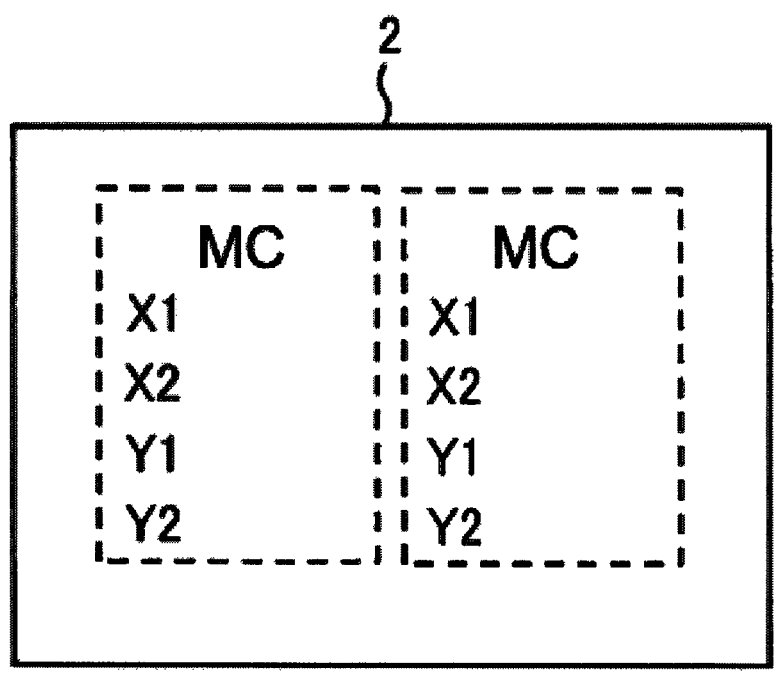

On determining NO in step S11, processing continues to step S12 and assesses whether or not the switching operation of opening and closing each of the normally closed contacts b1-b4 was carried out a predetermined number of times (YES or NO, step S12). On determining NO at step S12, processing returns to step S9. On determining YES at step S12, processing continues to step S8 and runs the malfunction processing illustrated in FIGS. 12A-12C, when, for instance, the first contact relay circuit 5 is experiencing an ON defect.

In this manner, the process flow in steps S5 to S8 thereby allows safe retesting of the normally closed contacts b1-b4 when, for instance, the first and second contact relay circuits 5, 6 each have a double pole structure.

Figure 10C:
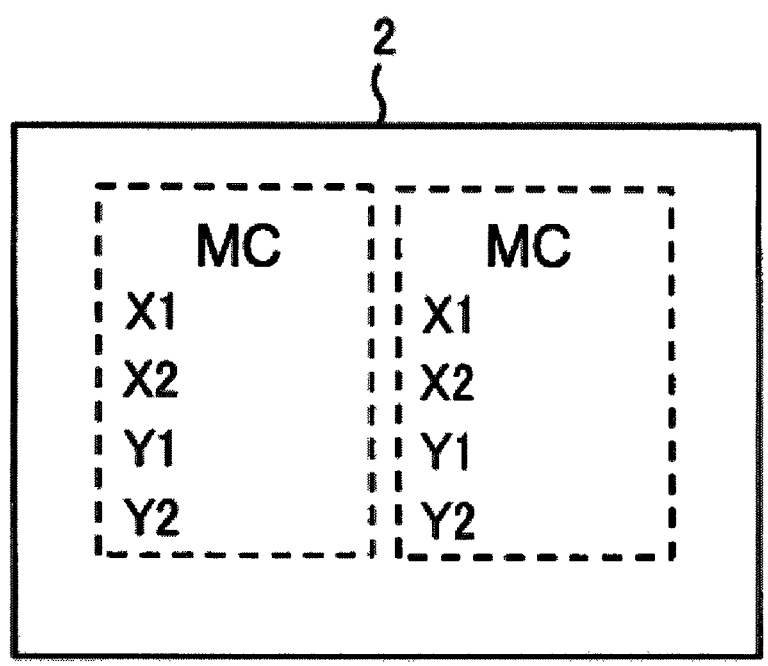
Figure 10D:
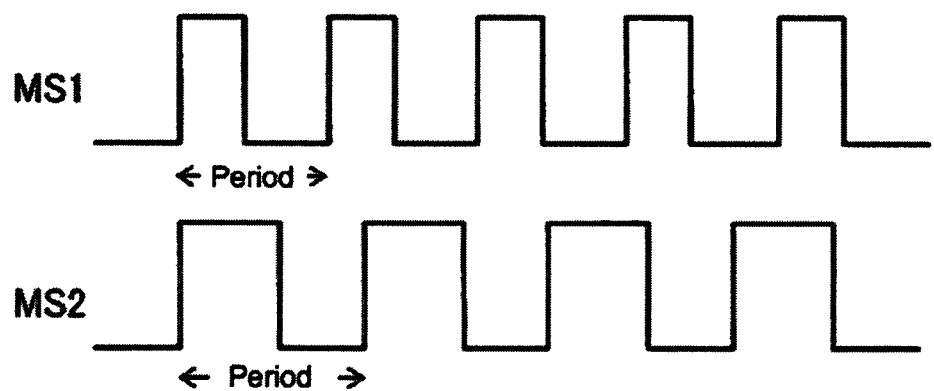
Figure 13A:
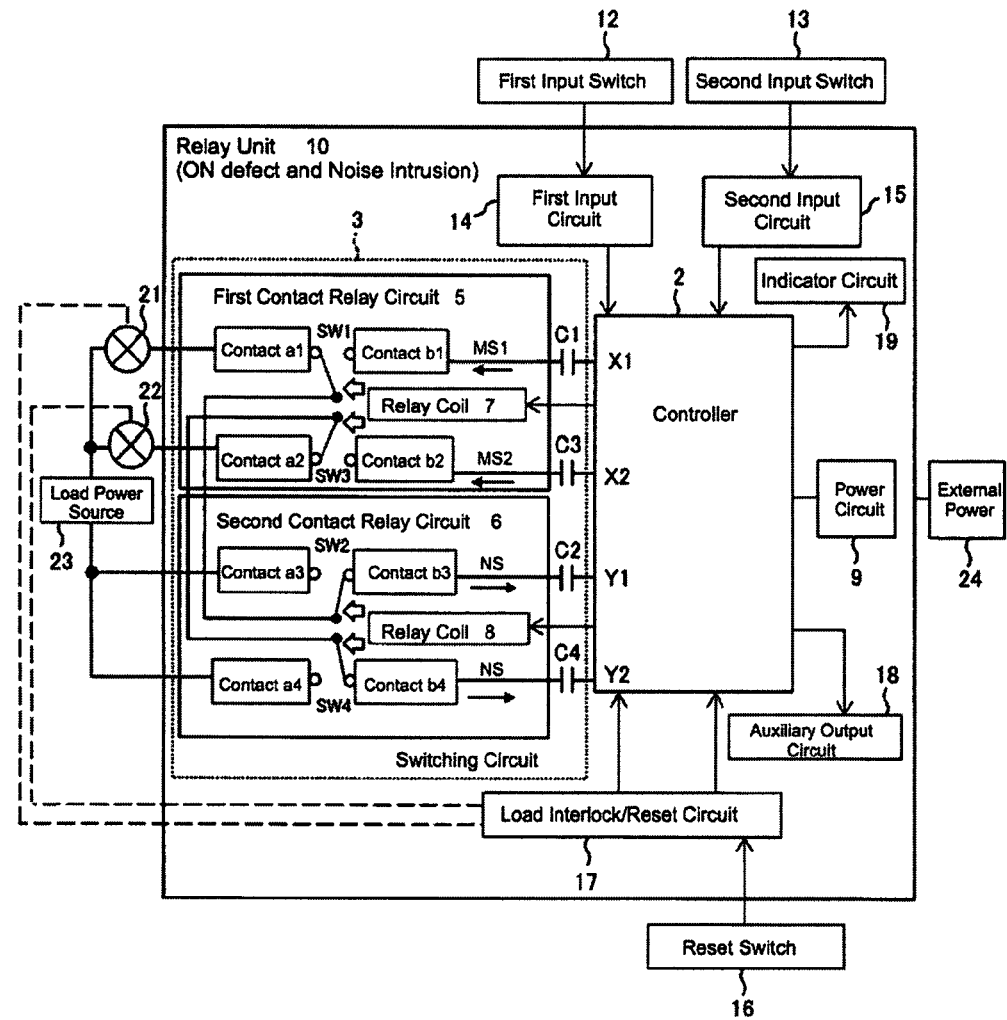
FIGS. 13A to 13D are block diagrams illustrating the state of a relay unit (double pole configuration) during an ON defect and during noise intrusion.
Figure 13B:
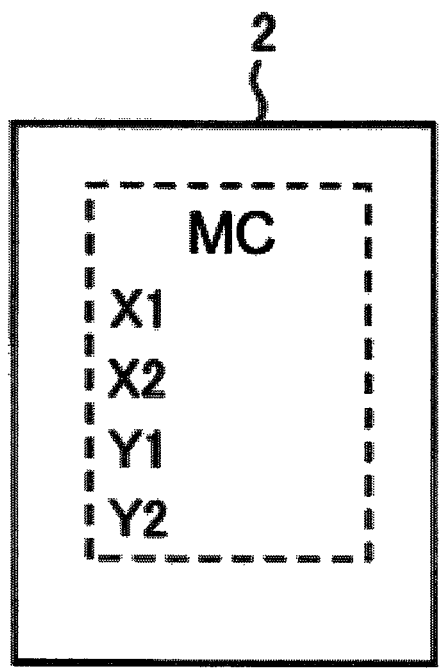
Figure 13C:
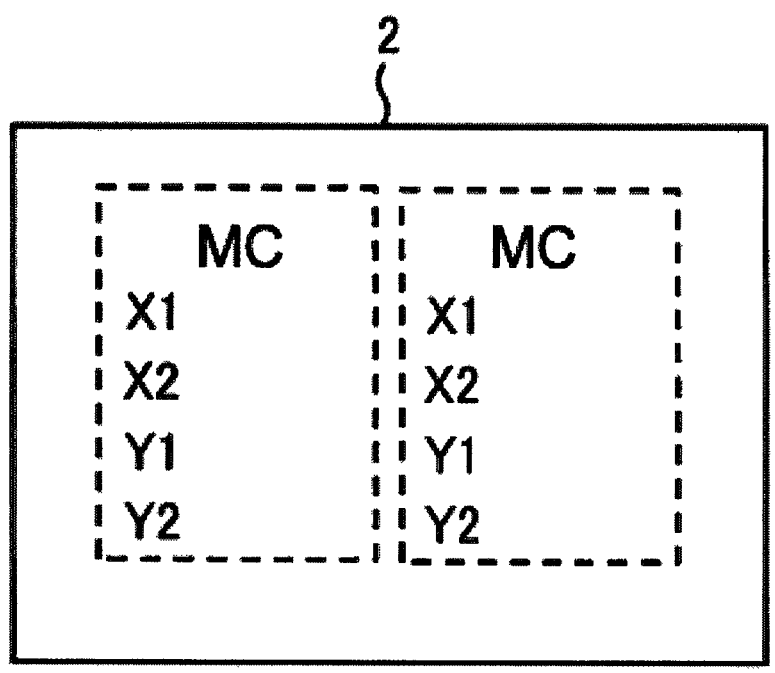
Figure 13D:
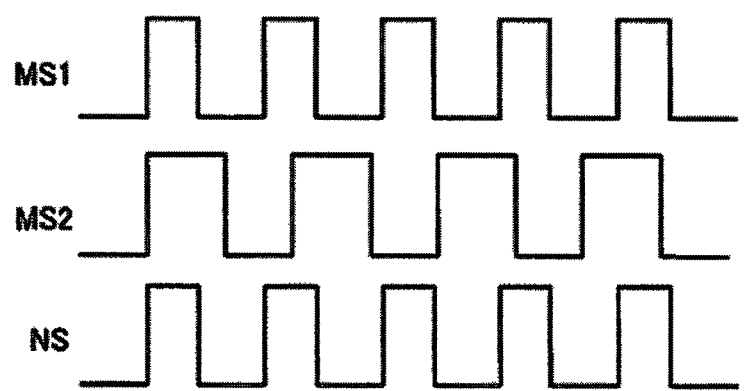

Additionally, it is desirable to differentiate at least one of the period, the duty cycle, and the number of pulses sent within an interval for the first test signal (MS1) and the second test signal (MS2) sent on channel 1 and channel 2 respectively as illustrated in FIG. 10D to thereby ensure that the first predetermined criteria and the second predetermined criteria are mutually different. In other words, the range defining the first lower and first upper limit thresholds inclusive for the period and the range defining the second lower and second upper limit thresholds inclusive for the period should not overlap each other, and the range defining the first lower and first upper limit thresholds inclusive for the number of pulses within a fixed interval and the range defining the second lower and second upper limit thresholds inclusive for the number of pulses within a fixed interval should not overlap. With the first predetermined criteria and the second predetermined criteria defined in this manner, the controller 2 is able to distinguish whether either of the contact relay circuits is experiencing an ON defect even when for instance, as illustrated in FIG. 13A the first test signal (MS1) and the second test signal (MS2) are not returned, and the controller 2 mistakenly receives noise NS which resembles the first test signal (MS1) at each of the terminals Y1, Y2.

When the controller 2 is made up of two microcomputers as illustrated in FIG. 10C, for instance, one of the microcomputers may control the relay coil 7, while the other microcomputer controls the relay coil 8. Each of the two microcomputers detects the state of the returning first test signal at the terminal Y1 to monitor (test) the state of the normally closed contacts b1, b2, and detects the state of the returning second test signal at the terminal Y2 to monitor (test) the state of the normally closed contacts b3, b4. Thus, such a redundancy configuration in the controller 2 allows safety to be maintained even if one of the microcomputers were to malfunction.

First and Second Embodiment

Although in the previous description the controller 2 used one or two microcomputers that run programs, the embodiments are not limited thereto. The controller 2 may use three or more microcomputers. Additionally, the controller 2 may be configured in hardware by assembling circuits providing each of the various functions.

As above described the relay unit is equipped with a switching circuit including at least one normally open contact and at least one normally closed contact; and a controller for controlling the switching circuit; the switching circuit in a state of de-energizing a load when the normally open contact is open and the normally closed contact is closed, and in a state of energizing a load when the normally open contact is closed and the normally closed contact is open. While the load is de-energized, the controller sends a test signal to the normally closed contact and detects the state of a returning test signal sent; when a detection result does not satisfy a predetermined criteria, the controller resends a test signal and re-detects the state of the returning test signal resent, and assesses the state of the returning test signal resent as normal when the re-detection result satisfies the predetermined criteria.

In this manner, by performing re-detection when the detection result does not satisfy a predetermined criteria, the number of cases may be reduced where the normally close contact is assessed as abnormal due to temporary factors (e.g., vibrations) or recoverable factors (e.g., intrusion of foreign particles) that occur in the normally close contact during the previous detection, thereby increasing the reliability of monitoring a normally closed contact.

In another configuration of the relay unit, the controller assess the state of the returning test signal resent as abnormal when the re-detection result does not satisfy the predetermined criteria.

Thus, assessing only those cases where the results of a retry do not satisfy the predetermined criteria as abnormal (i.e., malfunction in the relay unit) actually extends the operating life of the relay unit and improves the reliability of the relay unit.

In another configuration of the relay unit, the test signal is a pulse signal, and the predetermined criteria is whether the period of the returning test signal is between a lower limit threshold and an upper limit threshold, inclusive. This configuration simplifies the monitoring of the relay unit.

In another configuration of the relay unit, the test signal is a pulse signal, and the predetermined criteria is whether the number of pulses of the returning test signal within a fixed interval is between a lower limit threshold and an upper limit threshold, inclusive. This configuration simplifies the monitoring of the relay unit.

In another configuration of the relay unit, the test signal is a pulse signal, and the predetermined criteria is whether the period of the test returning signal is between a lower limit threshold and an upper limit threshold, inclusive, and whether the number of pulses of the returning test signal within a fixed interval is between a lower limit threshold and an upper limit threshold, inclusive. This configuration simplifies the monitoring of the relay unit.

In another configuration of the relay unit, the controller closes the normally open contact and opens the normally closed contact to energize the load on determining the returning test signal is normal.

Thus, safety may be ensured by energizing the load after assessing the returning test signal is normal.

In another configuration of the relay unit, when the detection result does not satisfy the predetermined criteria, the controller carries out re-detection after performing a switching operation that opens the normally closed contact momentarily and then closes the normally closed contact.

Thus, the controller performs a switching operation before the re-detection, which may thereby remove any foreign particles on the normally closed contact or change the contact point thereof.

In another configuration of the relay unit, the controller carries out re-detection after repeating the switching operation a predetermined number of times.

Thus, the controller can increase the effectiveness of the switching operation by repeating the switching operation a predetermined number of times.

In another configuration of the relay unit, the controller carries out re-detection after repeating the switching operation a predetermined number of times, and at the point the re-detection result satisfies a predetermined criteria, assesses the result as normal and halts the switching operation.

Thus, the switching operation is only performed for the required number of times to reduce the monitoring.

In another configuration of the relay unit, when the detection result does not satisfy a predetermined criteria the controller carries out re-detection after a predetermined amount of time has passed.

Thus, performing re-detection after a predetermined amount of time has passed reduces the number of cases where the returning test signal is assessed as abnormal due to the contacts being separated because of a momentary vibration.

In another configuration of the relay unit, the switching unit includes a plurality normally closed contacts, and the controller carries out the detection and re-detection of the signals returning from the plurality of normally closed contacts individually.

In this manner, carrying out the detection and re-detection of the signals returning from the plurality of normally closed contacts individually thereby increases the accuracy of the monitoring.

In another configuration of the relay unit, the switching unit includes a plurality normally closed contacts connected in series, and the controller carries out the detection and re-detection with an identical test signal sent to the plurality of normally closed contacts connected in series.

Thus, the detection and re-detection may be carried out collectively for the mutually connected plurality of normally closed contacts, thereby reducing the monitoring time.

In another configuration of the relay unit, when the detection result does not satisfy the predetermined criteria, the controller carries out the re-detection after opening one normally closed contact momentarily and then closing the normally closed contact, and subsequently opening another normally closed contact momentarily and then closing the other normally closed contact.

Hereby, it is possible to avoid accidentally energizing the load during the switching operation prior to re-detection, thus improving safety.

In another configuration of the relay unit, the switching unit includes a plurality of normally closed contacts, and when the detection result for one of the normally closed contacts does not satisfy the predetermined criteria, the controller carries out re-detection on the basis of the detection result from the one normally closed contact and another normally closed contact.

Thus, carrying out re-detection on the basis of the detection result for one normally closed contact and another normally closed contact allows for efficient safety monitoring.

In another configuration of the relay unit, the controller opens the normally open contact and closes the normally closed contact to de-energize the load on determining the returning test signal is abnormal.

Thus, when the returning test signal is assessed as abnormal, the switching circuit may be kept in the de-energized state to ensure safety even when an abnormality occurs (i.e., malfunctioning of the relay unit).

In another configuration of the relay unit, a notification unit is provided to give external notification when the controller assesses that the returning test signal is abnormal.

Providing a notification unit thereby allows an operator to be promptly notified of abnormalities (i.e., a malfunctioning of the relay unit), ensuring the operators safety.

As above described the relay unit is equipped with a switching circuit including at least one normally open contact and at least one normally closed contact; and a controller for controlling the switching circuit; the switching circuit in a state of de-energizing a load when the normally open contact is open and the normally closed contact is closed, and in a state of energizing a load when the normally open contact is closed and the normally closed contact is open. A control method for the relay unit involves, while the load is de-energized, sending a test signal to the normally closed contact and detecting the state of a returning test signal sent; when a detection result does not satisfy a predetermined criteria, resending a test signal and re-detecting the state of the returning test signal resent, and assessing the state of the returning test signal resent as normal when the re-detection result satisfies the predetermined criteria.

In this manner, by performing re-detection when the detection result does not satisfy a predetermined criteria, the number of cases may be reduced where the normally close contact is assessed as abnormal due to temporary factors (e.g., vibrations) or recoverable factors (e.g., intrusion of foreign particles) that occur in the normally close contact during the previous detection, thereby increasing the reliability of monitoring a normally closed contact.

The present invention is not limited to above descriptions; modifications made to the above-described embodiments as appropriate on the basis of common technical knowledge, or the various combinations of the embodiments and modifications thereto are also within the scope of the invention.

A relay unit according to the invention may be adopted into machines requiring control of energization of a load.

The invention claimed is:

1. A relay unit comprising:
    a switching circuit comprising at least one normally open contact and at least one normally closed contact; and
    a controller electrically coupled to the switching circuit via a first terminal and a second terminal and configured with a program for controlling the switching circuit; wherein
    the switching circuit is in a state of de-energizing a load when the normally open contact is open and the normally closed contact is closed, and the switching circuit is in a state of energizing the load when the normally open contact is closed and the normally closed contact is open;
    while the load is de-energized, the controller sends a test signal to the normally closed contact via the first terminal and detects a return state of the test signal via the second terminal;
    when the return state does not satisfy a predetermined criteria, the controller resends the test signal to the normally closed contact via the first terminal and re-detects a second return state of the test signal via the second terminal; and
    the controller assess the second return state of the test signal as normal when the second return state of the test signal satisfies the predetermined criteria.

2. The relay unit according to claim 1, wherein the controller assesses the second return state of the test signal as abnormal when the second return state of the test signal does not satisfy the predetermined criteria.

3. The relay unit according to claim 1, wherein the test signal is a pulse signal, and the predetermined criteria is satisfied when a period of the returning test signal is between a lower limit threshold and an upper limit threshold, inclusive.

4. The relay unit according to claim 1, wherein the test signal is a pulse signal, and the predetermined criteria is satisfied when a number of pulses of the returning test signal within a fixed interval is between a lower limit threshold and an upper limit threshold, inclusive.

5. The relay unit according to claim 1, wherein the test signal is a pulse signal, and the predetermined criteria is satisfied when a period of the returning test signal is between a lower limit threshold and an upper limit threshold, inclusive, and a number of pulses of the returning test signal within the fixed interval is between a second lower limit threshold and second upper limit threshold, inclusive.

6. The relay unit according to claim 1, wherein when the controller assesses the state of the returning test signal as normal, the controller closes the normally open contact and opens the normally closed contact to energize the load.

7. The relay unit according to claim 1, wherein when the return state does not satisfy the predetermined criteria, the controller carries out re-detection after performing a switching operation that opens the normally closed contact momentarily and then closes the normally closed contact.

8. The relay unit according to claim 7, wherein the controller carries out re-detection after repeating the switching operation a predetermined number of times.

9. The relay unit according to claim 7, wherein the controller carries out re-detection after repeating the switching operation a predetermined number of times, and assesses the second return state as normal and halts the switching operation at the point the second return state satisfies the predetermined criteria.

10. The relay unit according to claim 1, wherein in a condition in which the return state does not satisfy a predetermined criteria the controller carries out re-detection after a predetermined amount of time has passed.

11. The relay unit according to claim 1, wherein the switching unit comprises a plurality of the normally closed contacts, and the controller carries out the detection and the re-detection of the signals returning from the plurality of normally closed contacts individually.

12. The relay unit according to claim 1, wherein the switching unit comprises a plurality of the normally closed contacts connected in series, and the controller carries out the detection and the re-detection with an identical test signal sent to the plurality of normally closed contacts connected in series.

13. The relay unit according to claim 12, wherein when the return state does not satisfy the predetermined criteria, the controller carries out the re-detection after opening one normally closed contact momentarily and then closing the normally closed contact, and subsequently opening another normally closed contact momentarily and then closing the other normally closed contact.

14. The relay unit according to claim 1, wherein the switching unit comprises a plurality of the normally closed contacts, and the controller carries out the re-detection from one normally closed contact on the basis of the return state from the one normally closed contact and another normally closed contact.

15. The relay unit according to claim 2, wherein when the controller assesses that the return state of the test signal is abnormal, the controller opens the normally open contact and closes the normally closed contact to maintain the load in a de-energized state.

16. The relay unit according to claim 2, wherein the controller comprises a notification unit for providing an external notification when the controller assesses that the return state of the test signal is abnormal.

17. A control method for a relay unit equipped with a switching circuit, the switching circuit comprising:
at least one normally open contact and at least one normally closed contact; and
a controller electrically coupled to the switching circuit via a first terminal and a second terminal and configured with a program for controlling the switching circuit; wherein
the switching circuit is in a state of de-energizing a load when the normally open contact is open and the normally closed contact is closed, and the switching circuit is in a state of energizing the load when the normally open contact is closed and the normally closed contact is open;
the control method comprising:
sending, while the load is de-energized, a test signal to the normally closed contact;
detecting a return state of the test signal;
resending, when the return state does not satisfy a predetermined criteria, the test signal;
re-detecting a second return state of the test signal; and
assessing the second return state of the test signal as normal when the second return state satisfies the predetermined criteria.

18. The control method according to claim 17, further comprising assessing the second return state of the test signal as abnormal in when the second return state does not satisfy the predetermined criteria.

19. The control method according to claim 17, wherein the test signal is a pulse signal, and the predetermined criteria is satisfied when a period of the test signal is between a lower limit threshold and an upper limit threshold, inclusive.

20. The control method according to claim 17, wherein the test signal is a pulse signal, and the predetermined criteria is satisfied when a number of pulses within a fixed interval of the test signal is between a lower limit threshold and an upper limit threshold, inclusive.

* * * * *